(12) United States Patent
Fujikawa

(10) Patent No.: US 11,821,489 B2
(45) Date of Patent: Nov. 21, 2023

(54) VALVE MECHANISM AND SHOCK ABSORBER

(71) Applicant: SHOWA CORPORATION, Gyoda (JP)

(72) Inventor: Yosuke Fujikawa, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 532 days.

(21) Appl. No.: 17/110,002

(22) Filed: Dec. 2, 2020

(65) Prior Publication Data
US 2021/0088099 A1  Mar. 25, 2021

Related U.S. Application Data

(63) Continuation of application No. PCT/JP2018/028754, filed on Jul. 31, 2018.

(51) Int. Cl.
*F16F 9/34* (2006.01)
*F16F 9/06* (2006.01)
(Continued)

(52) U.S. Cl.
CPC .............. *F16F 9/348* (2013.01); *F16F 9/062* (2013.01); *F16F 9/065* (2013.01);
(Continued)

(58) Field of Classification Search
CPC .......... F16F 9/348; F16F 9/185; F16F 9/3488; F16F 9/516; F16F 9/187; F16F 2222/12;
(Continued)

(56) References Cited

U.S. PATENT DOCUMENTS 3,844,389 A * 10/1974 de Carbon ............ F16F 9/3484
188/282.1
4,899,855 A * 2/1990 de Carbon .............. F16F 9/348
188/322.22
(Continued)

FOREIGN PATENT DOCUMENTS

JP 09-014326 A 1/1997
JP 5397640 B2 1/2014
(Continued)

OTHER PUBLICATIONS

European Search Report dated Feb. 10, 2022 for the corresponding European Patent Application No. 18928219.7, 17 pages.
(Continued)

*Primary Examiner* — Robert A. Siconolfi
*Assistant Examiner* — James K Hsiao
(74) *Attorney, Agent, or Firm* — Leason Ellis LLP; Edward J. Ellis; Melvin C. Garner

(57) ABSTRACT

A valve mechanism includes an orifice collar having a hollow portion penetrating in an axial direction, a valve body having a central hole and an opening portion which penetrate in the axial direction and arranged so as to come into contact with an axial end surface of the orifice collar, and a drive valve which is movable in the axial direction and is arranged on an opposite side of the orifice collar with the valve body as a boundary, where the valve body includes spoke valves, each of which includes an outer frame portion, an inner frame portion, and a plurality of spoke portions connecting the outer frame portion 74 and the inner frame portion, and a protective valve which protects the spoke portion when the spoke portion of the spoke valve is deformed.

18 Claims, 10 Drawing Sheets

(51) Int. Cl.
*F16K 31/06* (2006.01)
*F16F 9/348* (2006.01)
*B62K 25/28* (2006.01)
*F16F 9/46* (2006.01)

(52) U.S. Cl.
CPC ........ *F16K 31/0696* (2013.01); *B62K 25/283* (2013.01); *F16F 9/46* (2013.01); *F16F 2222/12* (2013.01); *F16F 2228/066* (2013.01); *F16F 2230/0023* (2013.01); *F16F 2232/08* (2013.01); *F16F 2234/02* (2013.01)

(58) Field of Classification Search
CPC ............. F16F 2228/066; F16F 2232/08; F16F 2234/04; F16F 9/062; F16F 9/065; F16F 9/46; F16K 15/148; F16K 27/0209; F16K 31/0696; B60G 13/08; B60G 17/08; B60G 2202/24; B60G 2206/41; B60G 2500/11; B60G 2600/21; B60G 2800/162; B62K 25/283
See application file for complete search history.

(56) References Cited

U.S. PATENT DOCUMENTS

| | | | | |
|---|---|---|---|---|
| 5,042,624 | A * | 8/1991 | Furuya | F16F 9/348 188/322.22 |
| 5,529,154 | A * | 6/1996 | Tanaka | F16F 9/3484 188/280 |
| 7,048,099 | B2 * | 5/2006 | Umezawa | F16F 9/348 188/322.13 |
| 8,342,303 | B2 * | 1/2013 | Maeda | F16F 9/3485 188/315 |
| 9,212,719 | B2 * | 12/2015 | Kim | F16F 9/5126 |
| 9,777,790 | B2 * | 10/2017 | Mizuno | F16F 9/3485 |
| 11,098,781 | B2 * | 8/2021 | Eich | F16K 17/044 |
| 2008/0023280 | A1 | 1/2008 | Maeda | |
| 2009/0107782 | A1 * | 4/2009 | Ota | F16F 9/3485 188/282.5 |
| 2011/0114428 | A1 * | 5/2011 | Vanbrabant | F16F 9/34 188/322.15 |
| 2015/0316118 | A1 * | 11/2015 | Smeljanskij | F16F 9/19 188/313 |
| 2015/0323037 | A1 * | 11/2015 | De Kock | F16F 9/185 188/313 |
| 2016/0258504 | A1 * | 9/2016 | Mizuno | F16F 9/3484 |
| 2018/0216690 | A1 * | 8/2018 | Yamashita | F16F 9/19 |
| 2018/0340589 | A1 * | 11/2018 | Cheong | F16F 9/3485 |
| 2020/0063818 | A1 * | 2/2020 | Eich | F16F 9/3488 |

FOREIGN PATENT DOCUMENTS

| | | |
|---|---|---|
| JP | 2017-180606 A | 10/2017 |
| JP | 2017-180608 A | 10/2017 |
| WO | WO-2017-145983 A1 | 8/2017 |
| WO | 2018082852 A1 | 5/2018 |

OTHER PUBLICATIONS

International Search Report dated Aug. 28, 2018 for the corresponding PCT International Application No. PCT/JP2018/028754.
Written Opinion dated Aug. 28, 2018 for the corresponding PCT International Application No. PCT/JP2018/028754.

* cited by examiner

VALVE MECHANISM AND SHOCK ABSORBER

CROSS-REFERENCE TO RELATED APPLICATION

This application is a continuation of PCT application No. PCT/JP2018/028754, which was filed on Jul. 31, 2018, the content of which is incorporated herein by reference in its entirety.

FIELD OF THE INVENTION

The present invention relates to a valve mechanism and a shock absorber.

BACKGROUND OF THE INVENTION

Suspension devices for vehicles such as automobiles are equipped with a shock absorber which uses a damping force generating mechanism to appropriately reduce vibration transmitted from a road surface to a vehicle body while driving and improve riding comfort and steering stability. The shock absorber has a flow passage through which fluid flows. Further, a valve body forming a part of the flow passage may be elastically deformed by being pressed by a drive unit, thereby controlling a flow path area to adjust a damping force.

For example, Patent Literature 1 discloses a control valve portion which includes a valve seat member having a valve seat formed radially outside an opening at one end of a central flow passage of oil, a drive valve provided so as to be movable toward and away from the valve seat, a plurality of valve bodies provided between the valve seat and the drive valve and having opening portions through which oil flows, a solenoid actuator which moves the drive valve in a direction approaching the valve seat and makes the valve body closest to the drive valve of the plurality of valve bodies elastically deform in a direction in which an inner peripheral portion approaches the valve seat with respect to an outer peripheral portion of the valve body to make variable a gap flow passage between the inner peripheral portion of the valve body and the valve seat, and a valve rotation restraint portion which restrains relative rotation of the plurality of valve bodies in a circumferential direction in a state where the opening portions of the plurality of valve bodies communicate with each other.

Patent Literature 1: JP-A-2017-180606

When a valve body is pressed by a drive unit to be elastically deformed to control a flow passage area, the valve body may be excessively bent when a flow rate of fluid is increased.

SUMMARY OF THE INVENTION

An object of the invention is to provide a valve mechanism or the like which can prevent a valve body from excessively bending and further improve the durability of the valve body.

For this purpose, the completed invention is a valve mechanism which includes a tubular body having a hollow portion penetrating in an axial direction, a valve body having a through hole penetrating in the axial direction and arranged so as to come into contact with an axial end surface of the tubular body, and a drive valve which is movable in the axial direction and is arranged on an opposite side of the tubular body with the valve body as a boundary, where the valve body includes a spoke valve which includes an outer frame portion formed in an annular shape, an inner frame portion formed in an annular shape on an inner side in a radial direction with respect to the outer frame portion, and a plurality of spoke portions connecting the outer frame portion and the inner frame portion and a protective valve which protects the spoke portion when the spoke portion of the spoke valve is deformed.

Here, the valve body may be formed by stacking a plurality of the spoke valves and the protective valve may protect the spoke valve with which fluid first comes into contact during either a compression side stroke or an extension side stroke. In this case, it is possible to protect the excessively flexible spoke valve.

Further, the spoke valve may be a stack of three or more, and when three or more of the spoke valves are set to a first spoke valve located closest to the drive valve side, a second spoke valve located closer to the tubular body side than the first spoke valve, and a third spoke valve located closest to the tubular body side, the protective valve may be disposed in contact with the second spoke valve. In this case, when the first spoke valve or the third spoke valve bends, it comes into contact with the protective valve, and thus the deflection can be suppressed.

In addition, the third spoke valve may come into contact with the fluid first in either the compression side stroke or the extension side stroke and the protective valve may be disposed at least on the third spoke valve side with respect to the second spoke valve. In this case, it is possible to protect the third spoke valve, which tends to have low durability.

Also, the third spoke valve may allow the spoke portion to come into contact with the protective valve when bent. In this case, the spoke portion comes into contact with the protective valve, so that the spoke portion is less likely to bend.

In addition, a spacer may be interposed between the protective valve and the third spoke valve. In this case, the damping characteristic can be adjusted.

The protective valve may protect a connecting portion between the outer frame portion and the spoke portion of the spoke valve. In this case, it is possible to protect the connecting portion, which particularly tends to have low durability.

Also, the protective valve may be a claw valve having an annular outer frame portion and a claw portion protruding inward from the outer frame portion and formed at a position corresponding to the spoke portion of the spoke valve. In this case, the connecting portion of the spoke valve can be protected by the claw portion of the protective valve.

A positioning member for positioning the spoke valve and the protective valve may be further provided and the positioning member may perform circumferential positioning by forming a first recess portion for accommodating the spoke portion in the circumferential direction and forming a convex portion protruding with respect to the first recess portion at another location. This makes it easier to assemble the valve body.

Further, the positioning member may have a second recess portion recessed from the convex portion and formed to be shallower than the first recess portion and an upper surface of the first recess portion and an upper surface of the second recess portion may be on the same slope. This makes it easier to assemble the valve body.

Further, the invention is a shock absorber which includes the valve mechanism described above, a cylinder which accommodates a fluid, a piston which is slidably fitted in the cylinder, a piston rod which is connected to the piston and extended to the outside of the cylinder, and an oil reservoir chamber which compensates an amount of oil corresponding to an entry volume of the piston rod when the piston rod enters the cylinder, where the fluid which flows due to sliding of the piston flows into the valve mechanism to generate a damping force and the fluid which passes through the valve mechanism can flow through the oil reservoir chamber.

Advantageous Effects of Invention

According to the invention, the valve mechanism or the like which can suppress the excessive bending of the valve body and can further improve the durability of the valve body can be provided.

DETAILED DESCRIPTION OF THE INVENTION

Hereinafter, embodiments for implementing a valve mechanism, a damping force generating device, and a shock absorber according to the invention will be described with reference to the accompanying drawings. However, the invention is not limited to only those embodiments.

Description of Overall Configuration of Shock Absorber 10

Figure 1:
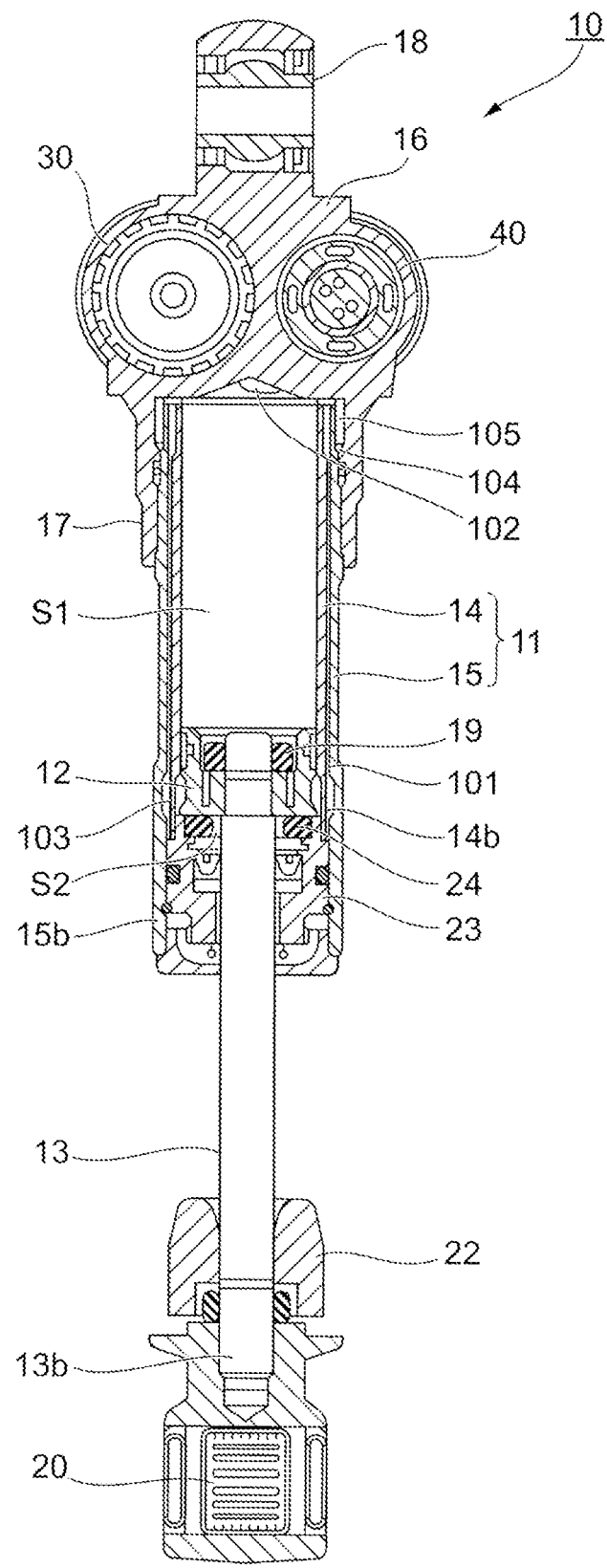
FIG. 1 is a cross-sectional view illustrating an overall configuration of a shock absorber according to an embodiment.

FIG. 1 is a cross-sectional view illustrating an overall configuration of a shock absorber 10 according to the embodiment.

As illustrated in FIG. 1, the shock absorber 10 is provided, for example, between a vehicle body of a motorcycle and a rear wheel support portion which supports the rear wheels and buffers shocks and vibrations input from the rear wheels. In the following description, the shock absorber 10 extends in an up-down direction, and a vehicle body side attachment portion 18 provided at an upper end portion thereof is connected to the vehicle body side and an axle side attachment member 20 provided at a lower end portion thereof is connected to a rear wheel side. However, the invention does not exclude the case where the shock absorber 10 is provided so as to extend in a lateral direction (substantially horizontal direction), for example.

The shock absorber 10 includes a cylinder 11, a piston 12, a piston rod 13, a reservoir 30, a damping force generating device 40, and a spring (not illustrated).

The cylinder 11 accommodates oil, which is an example of a fluid. The cylinder 11 is composed of an inner cylinder 14 and an outer cylinder 15 which form a concentric double tube. A damper case 16 provided with the vehicle body side attachment portion 18 is arranged on the upper end side of the shock absorber 10. The damper case 16 is provided with a cylindrical cylinder holding portion 17 extending toward the cylinder 11 side. The upper end portions of the outer cylinder 15 and the inner cylinder 14 are inserted into and held by the cylinder holding portion 17.

The inner diameter of the outer cylinder 15 of the cylinder 11 is larger than the outer diameter of the inner cylinder 14 by a certain size. As a result, a cylindrical flow passage 101 is formed between the outer cylinder 15 and the inner cylinder 14.

The outer cylinder 15 is formed so as to further protrude downward than a lower end portion 14b of the inner cylinder 14 by a predetermined dimension. Inside a lower end portion 15b of the outer cylinder 15, there is provided an annular rod guide 23 which slidably supports the piston rod 13 in a central axis direction (up-down direction in FIG. 1) thereof. The lower end portion 14b of the inner cylinder 14 hits an upper surface of the rod guide 23, whereby the lower end of the flow passage 101 is closed.

Further, the rod guide 23 is provided with a rebound rubber 24 on its upper side, which absorbs an impact when the piston 12 collides.

The piston 12 is fixed to the end of the piston rod 13 and is provided in contact with the cylinder 11 so as to be movable in an axial direction (up-down direction in FIG. 1) of the cylinder 11, and defines a space inside the cylinder 11. The piston 12 is fitted inside the inner cylinder 14 of the cylinder 11 so as to be slidable along the central axis direction (up-down direction in FIG. 1) of the inner cylinder 14. The piston 12 divides the inner space of the inner cylinder 14 of the cylinder 11 into a piston-side oil chamber S1 formed on the damper case 16 side and a rod-side oil chamber S2 formed on the piston rod 13 side.

An oil hole 102 which opens to the piston-side oil chamber S1 is formed in the damper case 16 at a position facing an upper end opening of the inner cylinder 14. The oil hole 102 communicates with a first oil chamber S11 (see FIG. 3) of the damping force generating device 40 described below.

A plurality of oil holes 103 are formed in the lower end portion 14b of the inner cylinder 14, and the oil holes 103 makes the rod-side oil chamber S2 and the flow passage 101 communicate with each other.

Further, at the upper end portion of the flow passage 101, a plurality of oil holes 104 are formed in the outer cylinder 15 at a portion facing the cylinder holding portion 17. Those oil holes 104 make the piston-side oil chamber S1 and the flow passage 101 communicate with each other.

The damper case 16 has a flow passage 105 formed at a position facing the oil hole 104, the flow passage 105 communicating with a third oil chamber S13 (see FIG. 3) of the damping force generating device 40 described below.

The piston rod 13 relatively moves in the axial direction (up-down direction in FIG. 1) of the cylinder 11. The piston rod 13 is fixed to the piston 12 by a nut 19. The piston rod 13 extends along the central axis direction (up-down direction in FIG. 1) of the inner cylinder 14, penetrates the rod guide 23, and projects to the outside of the cylinder 11. Therefore, it can be said that the piston rod 13 is a member which is connected to the piston 12 and extends to the outside of the cylinder 11. An axle side attachment member 20 is provided on a lower end 13b of the piston rod 13. On the cylinder 11 side of the axle side attachment member 20, a bump rubber 22 for preventing bottoming of the shock absorber 10 is provided by being inserted into the piston rod 13.

[Description of Reservoir 30]

Figure 2:
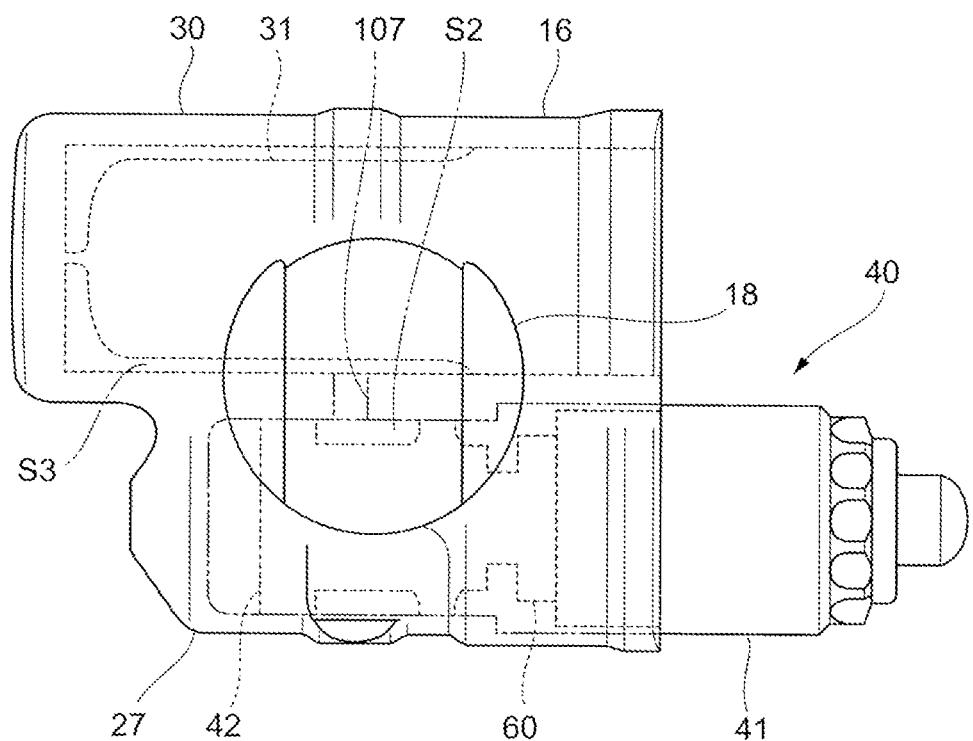
FIG. 2 is a plan view illustrating a damper case provided in the shock absorber.

FIG. 2 is a plan view illustrating the damper case 16 provided in the shock absorber 10.

As illustrated in FIG. 2, the reservoir 30 is formed in the damper case 16 and has, for example, a cylindrical shape and is provided with a bag-shaped bladder 31 therein. The bladder 31 is formed into a bag shape with an elastic body such as rubber and can be expanded or contracted. The inside of the bladder 31 is filled with gas such as air. Also, in the reservoir 30, the space outside the bladder 31 serves as an oil reservoir chamber S3 and communicates with a second oil chamber S12 (see FIG. 3) of the damping force generating device 40 described below via a communication passage 107. That is, the oil which has passed through the damping force generating device 40 can flow through the oil reservoir chamber S3.

Oil is filled in the piston side oil chamber S1 in the cylinder 11, the rod-side oil chamber S2, the flow passage 101 between the inner cylinder 14 and the outer cylinder 15, the oil reservoir chamber S3 in the reservoir 30, and the damping force generating device 40 described below, as described above.

[Description of Damping Force Generating Device 40]

Figure 3:
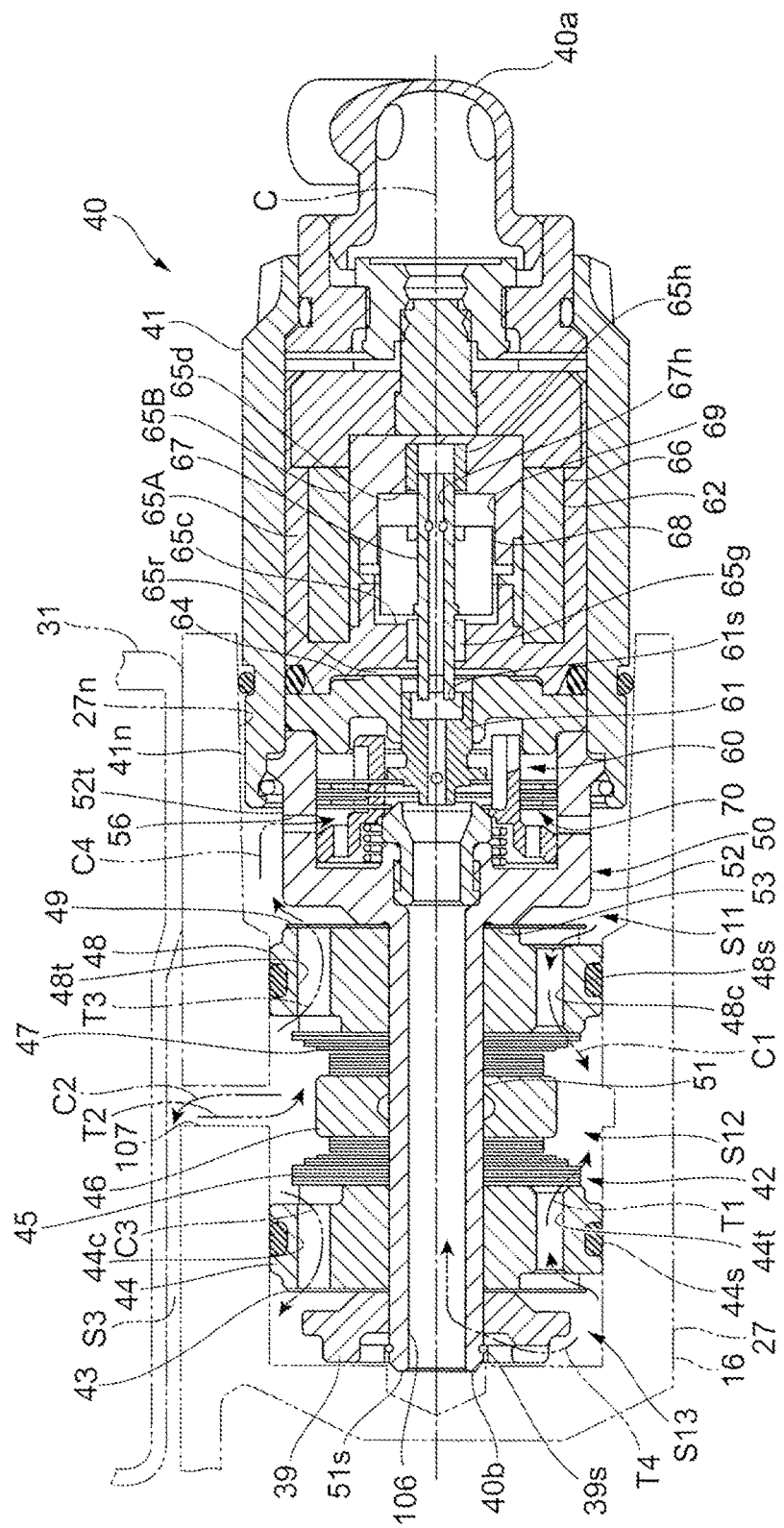
FIG. 3 is a cross-sectional view illustrating a damping force generating device provided in the damper case.

FIG. 3 is a cross-sectional view illustrating the damping force generating device 40 provided in the damper case 16.

The damping force generating device 40 has a flow path through which oil flows in accordance with the relative movement of the piston rod 13 and generates a damping force when the oil flows through the flow path. The damping force generating device 40 is provided on a bottomed cylindrical damper holding portion 27 formed on the damper case 16. The damping force generating device 40 has a cylindrical shape as a whole and mainly includes a cartridge case 41, a main damper 42, a valve seat member 50, and a control valve portion 60.

The damping force generating device 40 is provided with a cylindrical cartridge case 41 on the first end 40a side thereof. A male screw portion 41n is formed on the outer peripheral surface of the cartridge case 41. The damping force generating device 40 is detachably held by the damper holding portion 27 by screwing the male screw portion 41n of the cartridge case 41 into a female screw portion 27n formed on the inner peripheral surface of the damper holding portion 27.

In the following description, in the damping force generating device 40, the end on the side where the cartridge case 41 is provided is set as a first end 40a, the opposite end is set as a second end 40b, and a direction connecting the first end 40a and the second end 40b is set as a central axis C direction.

The main damper 42 is an example of a damping force generating mechanism and is provided on the second end 40b side of the damping force generating device 40 so as to be exposed from the cartridge case 41. In the main damper 42, in a direction from the second end 40b side of the damping force generating device 40 to the first end 40a side, a valve stopper 39, a compression side outlet check valve 43, an extension side valve seat member 44, an extension side damping valve 45, an intermediate member 46, a compression side damping valve 47, a compression side valve seat member 48, and an extension side outlet check valve 49 are sequentially arranged.

The valve stopper 39, the compression side outlet check valve 43, the extension side valve seat member 44, the extension side damping valve 45, the intermediate member 46, the compression side damping valve 47, the compression side valve seat member 48, and the extension side outlet check valve 49 are each formed in an annular shape.

In the extension side valve seat member 44, a plurality of extension side inlet oil passages 44t and compression side outlet oil passages 44c are alternately formed along the circumferential direction. The extension side inlet oil passage 44t and the compression side outlet oil passage 44c are formed so as to penetrate the extension side valve seat member 44 in the central axis C direction.

The extension side inlet oil passage 44t is open to the second end 40b side of the extension side valve seat member 44. The extension side damping valve 45 is provided so as to close the outlet on the first end 40a side of the extension side inlet oil passage 44t. The extension side damping valve 45 is configured by stacking a plurality of disc valves.

The compression side outlet oil passage 44c opens to the first end 40a side of the extension side valve seat member 44. The compression side outlet check valve 43 is formed of a disc valve and is provided so as to close the outlet on the second end 40b side of the compression side outlet oil passage 44c.

A plurality of compression side inlet oil passages 48c and a plurality of extension side outlet oil passages 48t are alternately formed in the compression side valve seat member 48 along the circumferential direction. The compression side inlet oil passage 48c and the extension side outlet oil passage 48t are formed so as to penetrate through the compression side valve seat member 48 in the central axis C direction.

The compression side inlet oil passage 48c opens to the first end 40a side of the compression side valve seat member 48. The compression side damping valve 47 is provided so as to close the outlet on the second end 40b side of the compression side inlet oil passage 48c. The compression side damping valve 47 is configured by stacking a plurality of disc valves.

The extension side outlet oil passage 48t is open to the second end 40b side of the compression side valve seat member 48. The extension side outlet check valve 49 is formed of a disc valve and is provided so as to close the outlet on the first end 40a side of the extension side outlet oil passage 48t.

The extension side damping valve 45 normally closes the extension side inlet oil passage 44t to block the flow of oil and flexibly deforms according to the pressure passing through the extension side inlet oil passage 44t, and when the oil passes through the gap between the extension side inlet oil passage 44t, a damping force is generated. Further, the compression side damping valve 47 normally closes the compression side inlet oil passage 48c to block the flow of oil and flexibly deforms according to the pressure passing through the compression side inlet oil passage 48c, and when the oil passes through the gap between the compression side inlet oil passage 48c, a damping force is generated. In the extension side damping valve 45, the generated damping force is adjusted by adjusting the number of disc valves. Further, in the compression side damping valve 47, the generated damping force is adjusted by adjusting the number of disc valves.

The compression side outlet check valve 43 normally closes the compression side outlet oil passage 44c to block the flow of oil and flexibly deforms according to the pressure of the oil passing through the compression side outlet oil passage 44c to allow the oil to flow. The extension side outlet check valve 49 normally closes the extension side outlet oil passage 48t to block the oil flow and flexibly deforms according to the pressure of the oil passing through the extension side outlet oil passage 48t to allow the oil to flow.

The valve seat member 50 has a small diameter portion S1 and a large diameter portion 52.

The small diameter portion 51 is formed on the second end 40b side of the valve seat member 50.

The small diameter portion 51 extends along the central axis C direction of the damping force generating device 40 and is inserted through openings formed in the central portions of the annular valve stopper 39, the compression side outlet check valve 43, the extension side valve seat member 44, the extension side damping valve 45, the intermediate member 46, the compression side damping valve 47, the compression side valve seat member 48, and the extension side outlet check valve 49. The outer diameter of the small diameter portion 51 is approximately the same as the diameter of the openings formed in the central portion of the annular valve stopper 39, the compression side outlet check valve 43, the extension side valve seat member 44, the extension side damping valve 45, the intermediate member 46, the compression side damping valve 47, the compression side valve seat member 48, and the extension side outlet check valve 49. The valve stopper 39 arranged closest to the second end 40b side is restricted from moving from the small diameter portion 51 toward the second end 40b side by a stopper ring 39s provided on an outer peripheral surface of the small diameter portion 51.

The large diameter portion 52 has an outer diameter larger than that of the small diameter portion 51 and is formed continuously on the first end 40a side of the small diameter portion 51. An orthogonal surface 53 orthogonal to the central axis C direction is formed between the large diameter portion 52 and the small diameter portion 51. The extension side outlet check valve 49 hits the orthogonal surface 53 and is restricted from moving toward the large diameter portion 52 side.

Figure 4:
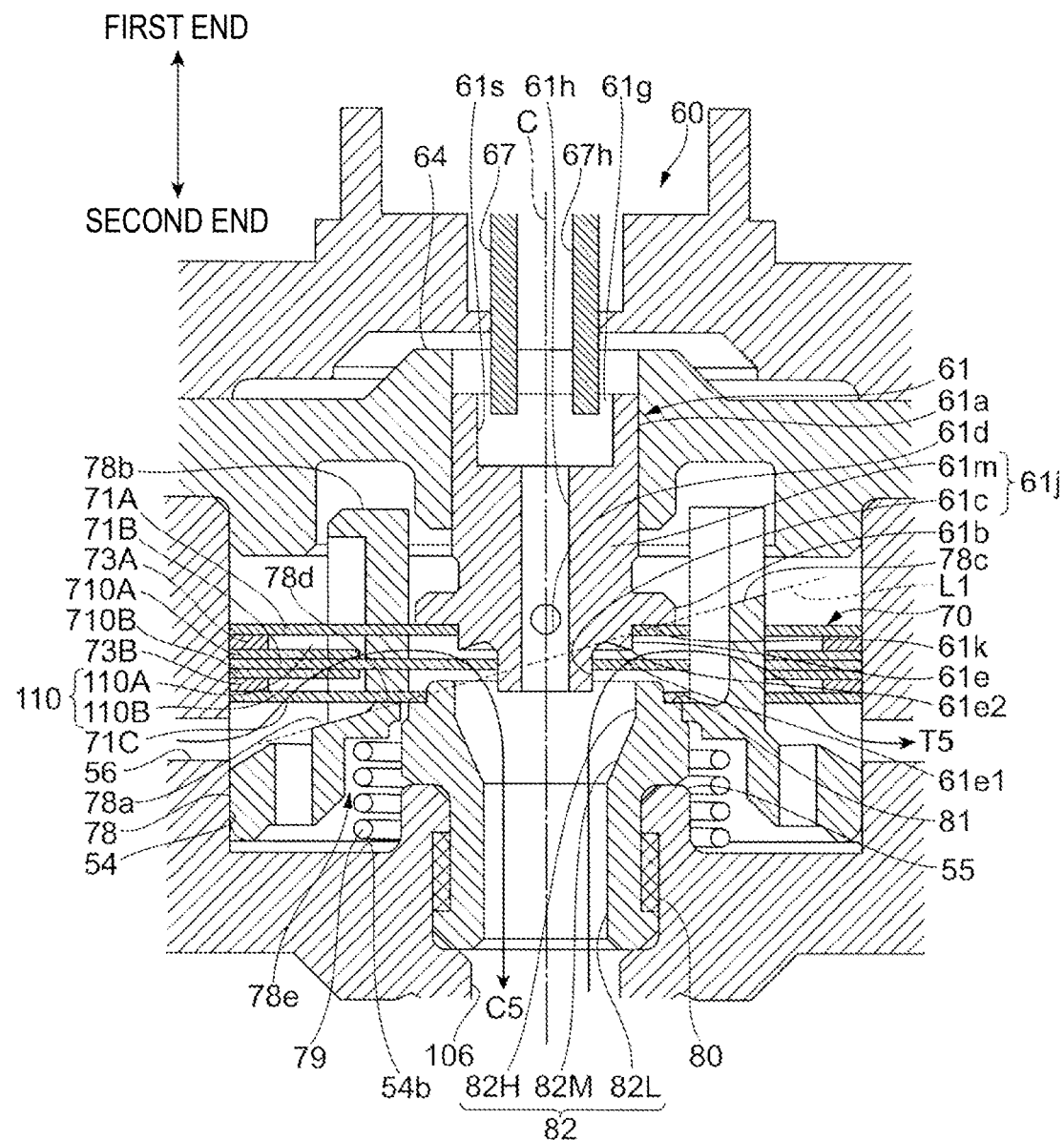
FIG. 4 is an enlarged cross-sectional view illustrating a configuration of a control valve portion of the damping force generating device.

FIG. 4 is an enlarged cross-sectional view illustrating the configuration of the control valve portion 60 of the damping force generating device 40.

As illustrated in FIGS. 3 and 4, the large diameter portion 52 is provided with a recess portion 54 which is recessed toward the small diameter portion 51 side. At the center of the recess portion 54 of the large diameter portion 52, a boss portion 55 which is raised from a bottom surface 54b of the recess portion 54 is formed.

Further, in the large diameter portion 52, a cylindrical portion 52t is formed on the first end 40a side so as to further expand on the outer peripheral side and extend to the first end 40a (upper part of FIG. 4, see FIG. 3) side.

The large diameter portion 52 is formed with a flow passage hole 56 penetrating the inside and outside thereof. The flow passage hole 56 is formed on an outer peripheral side of a valve body 70 of the control valve portion 60 described below.

As illustrated in FIGS. 3 and 4, the valve seat member 50 is formed with a central flow passage 106 which makes a tip portion 51s on the second end 40b side of the small diameter portion 51 and the boss portion 55 of the large diameter portion 52 communicate with each other.

In such a valve seat member 50, the cylindrical portion 52t and a part of the large diameter portion 52 on the first end 40a side are inserted into the cartridge case 41 and the second end 40b side of the large diameter portion 52 and the main damper 42 held by the small diameter portion 51 project outward from the cartridge case 41.

In this way, the main damper 42 protruding from the cartridge case 41 to the second end 40b side and the large diameter portion 52 of the valve seat member 50 are inserted and arranged inside the bottomed tubular damper holding portion 27.

Returning to FIG. 3, the extension side valve seat member 44 and the compression side valve seat member 48 of the main damper 42 are respectively provided with annular seal rings 44s and 48s on their outer peripheral surfaces. In a state where the main damper 42 is accommodated in the damper holding portion 27, respective seal rings 44s and 48s hit the inner peripheral surface of the damper holding portion 27, whereby the first oil chamber S11, the second oil chamber S12, and the third oil chamber S13 are formed between the damper holding portion 27 and the main damper 42.

The first oil chamber S11 is formed further on the first end 40a side than the seal ring 48s of the compression side valve seat member 48. The second oil chamber S12 is formed between the seal ring 44s of the extension side valve seat member 44 and the seal ring 48s of the compression side valve seat member 48. The third oil chamber S13 is formed between the bottom on the second end 40b side of the damper case 16 and the seal ring 44s of the extension side valve seat member 44.

The tip portion Ms of the small diameter portion 51 of the valve seat member 50 is arranged in the third oil chamber S13 of the damper case 16 and the third oil chamber S13 and a central flow passage 106 formed in the small diameter portion 51 communicate with each other.

Also, in the damper case 16, the communication passage 107 communicating with the oil reservoir chamber S3 in the reservoir 30 is formed between the compression side valve seat member 48 and the extension side valve seat member 44 at a position facing the second oil chamber S12.

The control valve portion 60 is an example of a valve mechanism. The control valve portion 60 includes a drive valve 61, a solenoid actuator 62 which drives the drive valve 61, an annular valve body holder 64 fitted inside the cylindrical portion 52t, the valve body 70 accommodated in the recess portion 54, and an orifice collar 80 arranged so as to be able to come into contact with the valve body 70. Furthermore, the control valve portion 60 is provided with a valve collar 78 and a coil spring 79 arranged between the valve collar 78 and the orifice collar 80.

The drive valve 61 is provided on the valve body holder 64 so as to be movable along the central axis C direction of the damping force generating device 40. The drive valve 61 is arranged on an opposite side (the drive valve 61 is above the valve body 70 and the orifice collar 80 is below the valve body 70) of the orifice collar 80 from the valve body 70.

As illustrated in FIG. 4, the drive valve 61 includes a shaft portion 61j having a flow passage 61h formed in the central axis C direction therein and a first step portion 61b extending from an outer peripheral surface 61a of the shaft portion 61j to the radial outside of the shaft portion 61j. The flow passage 61h is a through hole penetrating in the central axis C direction. Therefore, the shaft portion 61j has a substantially cylindrical shape as a whole by the outer peripheral surface 61a and the flow passage 61h. In this case, the outer peripheral surface 61a is the outer surface of the cylinder and the flow passage 61h is the inner peripheral surface or the inner surface of the cylinder. The shaft portion 61j has a rod accommodating portion 61s which is recessed toward the tip portion side at the rear end portion on the first end 40a side.

Further, the drive valve 61 has an annular first step portion 61b protruding from the outer peripheral surface 61a in a direction intersecting with the central axis C direction (axial direction). In this case, the first step portion 61b is an annular portion protruding from the outer peripheral surface 61a in a direction substantially perpendicular to the central axis C direction and continuing to the outer peripheral surface 61a. Then, the drive valve 61 forms an accommodation portion 61k by the first step portion 61b. In the embodiment, a spoke valve 71A, which will be described below, which is a part of the valve body 70, is accommodated in the accommodation portion 61k. The direction in which the first step portion 61b projects from the outer peripheral surface 61a is also the direction along which the oil flows. That is, the first step portion 61b projects in a direction substantially perpendicular to the central axis C direction, and thus a part of the valve body 70, which is arranged in a direction substantially perpendicular to the central axis C direction, is accommodated without a gap and the flow of oil is not easily obstructed. When the drive valve 61 presses the valve body 70, the first step portion 61b presses the spoke valve 71A and the spoke valve 71A elastically deforms toward the orifice collar 80 side.

Further, the shaft portion 61j includes a protruding portion 61c which further protrudes toward the second end 40b side (orifice collar 80 side) than the first step portion 61b and a base portion 61m extending toward the opposite side of the protruding portion 61c with respect to the first step portion 61b and having a larger outer peripheral diameter than the outer diameter of the protruding portion 61c. Further, the protruding portion 61c has a cylindrical shape because it has the above-described flow passage 61h inside. The protruding portion 61c has a role of flowing oil in the central axis C direction. Although details will be described below, for example, in the compression side stroke, the oil flows from the radial outside of the shaft portion 61j toward the outer peripheral surface 61a along the first step portion 61b, then changes the direction along the protruding portion 61c and flows toward the second end 40b side, and then flows toward the central flow passage 106. In this way, the protruding portion 61c changes the direction of the oil flow from the radial direction of the shaft portion 61j to the central axis C direction. Therefore, it can be said that the protruding portion 61c is an oil direction changing portion for flowing the oil toward the central flow passage 106. Also, in the extension side stroke, oil flows in the opposite direction. In this case as well, it can be said that the protruding portion 61c is an oil direction changing portion for changing the flow of oil from the central axis C direction to the radial direction of the shaft portion 61j. Therefore, it can be said that the protruding portion 61c is also formed along the direction along which the oil flows.

Furthermore, the drive valve 61 has a communication hole 61d which connects the outer peripheral surface of the protruding portion 61c of the shaft portion 61j and the flow passage 61h.

Figure 5:
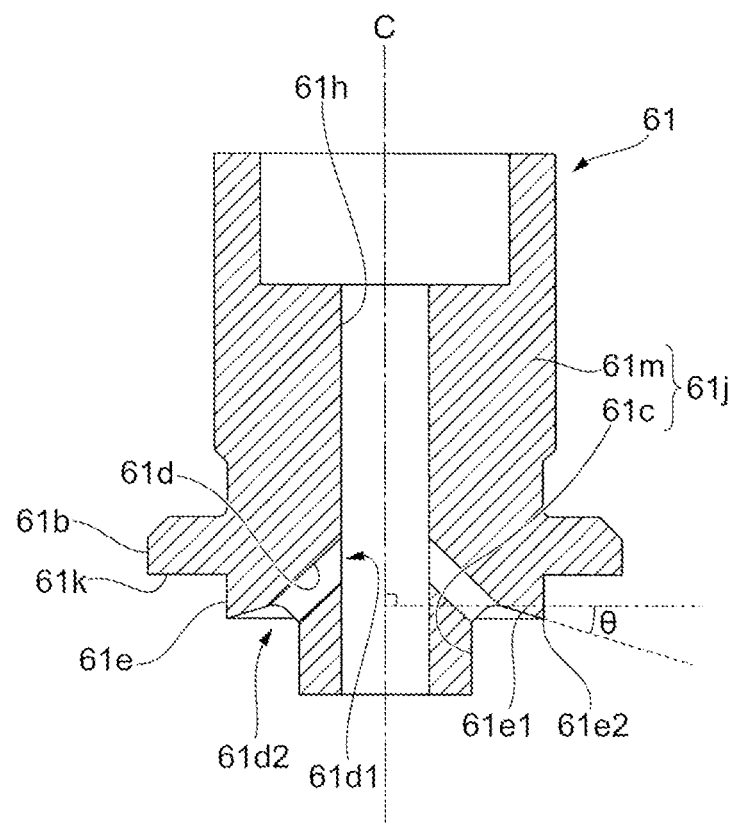
FIG. 5 is a diagram illustrating a communication hole and is a diagram illustrating a drive valve in a cross section different from that in FIG. 4.

FIG. 5 is a diagram illustrating the communication hole 61d and is a diagram illustrating the drive valve 61 in a cross section different from that in FIG. 4.

The communication hole 61d is an oblique hole which extends from the outer peripheral surface of the protruding portion 61c in a direction oblique to the central axis C direction (axial direction) and communicates with the flow passage 61h. In other words, the communication hole 61d is an oblique hole which is linearly formed obliquely from the outer peripheral surface of the protruding portion 61c toward the first end 40a. The communication hole 61d is open to the flow passage 61h at a portion closer to the protruding portion 61c than the base portion 61m. The communication hole 61d is an oblique hole in which a second opening 61d2 opening on the outer peripheral surface of the protruding portion 61c is arranged further on the second end 40b side (orifice collar 80 side) than a first opening 61d1 opening on the flow passage 61h.

Furthermore, the drive valve 61 has a second step portion 61e extending from the outer peripheral surface of the protruding portion 61c to the outside in the radial direction of the protruding portion 61c. The second step portion 61e is formed in an annular shape around the central axis C and the outer diameter of the second step portion 61e is smaller than the outer diameter of the first step portion 61b. Further, the second step portion 61e has an annular recess portion 61e1 on the end surface on the second end 40b side (orifice collar 80 side). As illustrated in FIG. 5, the angle θ formed by a plane having the central axis C as a normal direction and an inclined surface on an apex portion 61e2 side of the recess portion 61e1 facing the orifice collar 80 is preferably 10° or more and 30° or less)(10° 030°, and particularly preferably 20°. As a result, a vortex is less likely to occur and the oil flow in the compression side stroke becomes smoother.

Further, the second step portion 61e faces a spoke valve 71B of the valve body 70 which is arranged further on the second end 40b side (orifice collar 80 side) than the spoke valve 71A of the valve body 70 described below in detail. The second step portion 61e is not in contact with the spoke valve 71B when the drive valve 61 does not press the valve body 70. When the drive valve 61 presses the valve body 70, the second step portion 61e comes into contact with the spoke valve 71B and the second step 61e presses the spoke valve 71B, and further the spoke valve 71B elastically deforms toward the second end 40b side (orifice collar 80 side). In this case, since the recess portion 61e1 is formed in the second step portion 61e, the apex portion 61e2 of the second step portion 61e comes into contact with the spoke valve 71B.

The solenoid actuator 62 is an example of a drive unit which moves the drive valve 61 in the axial direction. The solenoid actuator 62 is provided in the cartridge case 41 as illustrated in FIG. 3. Further, the solenoid actuator 62 includes two cores 65A and 65B, a coil 66, a rod 67, and a plunger 68.

The core 65A has a bottomed tubular shape having a recess portion 65c and the core 65B has a bottomed tubular shape having a recess portion 65d. The two cores 65A and 65B are provided with the recess portions 65c and 65d facing each other, thereby forming a plunger chamber 69 continuous in the central axis C direction.

The rod 67 extends along the central axis C direction. The rod 67 is slidably held along the central axis C direction by a guide bush 65g provided on one core 65A and a guide bush 65h provided in a recess portion formed on the other core 65B.

The rod 67 has a through hole 67h penetrating in the central axis C direction.

The tip portion of the rod 67 on the second end 40b side is inserted into the rod accommodating portion 61s provided in the drive valve 61. The outer diameter of the rod 67 is smaller than the inner diameter of the rod accommodating portion 61s, whereby a cylindrical gap 61g is formed with respect to the rod 67 in the rod accommodating portion 61s. The rod 67 has a communication hole (not illustrated) for communicating the inside of the through hole 67h and the gap 61g at the tip portion on the second end 40b side.

Further, between the core 65A and the valve body holder 64, a back pressure chamber 65r which spreads to the outer peripheral side of the rod 67 is formed. The back pressure chamber 65r communicates with the gap 61g and further communicates with the inside of the through hole 67h of the rod 67 through a communication hole (not illustrated).

Such a solenoid actuator 62 adjusts the electromagnetic force generated in the coil 66 by increasing/decreasing the current applied to the coil 66, so that the rod 67 moves back and forth in the central axis C direction. By moving the rod 67 back and forth, the position of the drive valve 61 can be adjusted in the central axis C direction. That is, the solenoid actuator 62 generates a thrust force which presses the drive valve 61 toward the second end 40b when a current is applied to the coil 66. The drive valve 61 presses the valve body 70 toward the second end 40b due to this thrust force and the pressure of the oil flowing into the back pressure chamber 65r.

Figure 6:
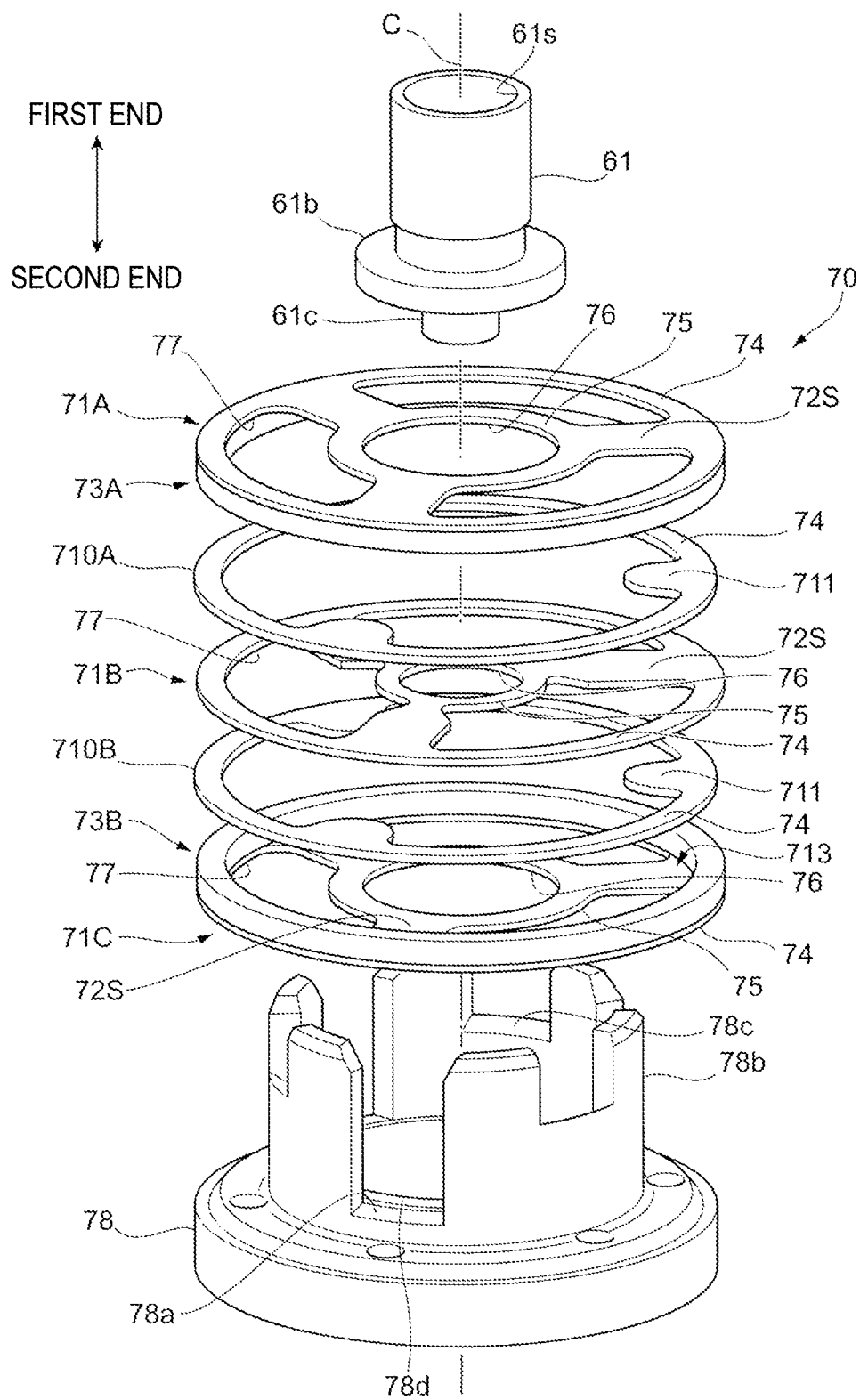
FIG. 6 is a diagram illustrating a configuration of a valve body.

FIG. 6 is a diagram illustrating the configuration of the valve body 70.

In addition, in FIG. 6, in addition to the valve body 70, the drive valve 61 and the valve collar 78 are also illustrated.

The illustrated valve body 70 is a member having a cylindrical shape as a whole. The valve body 70 is arranged so that its center substantially coincides with the central axis C. The valve body 70 has the spoke valve 71A, a spacer 73A, a protective valve 710A, the spoke valve 71B, a protective valve 710B, a spacer 73B, and a spoke valve 71C, which are sequentially stacked from the first end 40a to the second end 40b. In other words, it can be said that the spoke valve 71A, the spoke valve 71B, and the spoke valve 71C are stacked in the direction in which the solenoid actuator 62 presses the drive valve 61. In the embodiment, the valve body 70 includes a plurality of axially stacked valve bodies (three spoke valves 71A, 71B, and 71C), the spacers (spacers 73A and 73B arranged between the spoke valves adjacent to each other in the stacking direction) arranged between the valve bodies adjacent to each other in the stacking direction, and the protective valves (710A and 710B disposed so as to interpose the spoke valve 71B) disposed in contact with the spoke valve 71B. Here, the case where three spoke valves are stacked in the axial direction is illustrated, but the invention can be configured to include four or more spoke valves stacked in the axial direction.

The spoke valve 71A is an example of a first spoke valve located at the upper end of the plurality of valve bodies on the first end 40a side. It can also be said that the spoke valve 71A is located closest to the drive valve 61 side among the three spoke valves 71A, 71B, and 71C. The spoke valve 71A includes an outer frame portion 74 formed in an annular shape, an inner frame portion 75 formed annularly on the inner side in the radial direction with respect to the outer frame portion 74, and a plurality of spoke portions 72S connecting the outer frame portion 74 and the inner frame portion 75. As a result, a central hole 76 is formed inside the inner frame portion 75. Further, a plurality of the spoke portions 72S are arranged apart from each other, and in the embodiment, three spoke portions 72S are arranged at equal intervals in the circumferential direction. That is, one spoke portion 72S is arranged every 120° in the circumferential direction. As a result, three opening portions 77 are formed between the adjacent spoke portions 72S in the circumferential direction. The central hole 76 and the opening portion 77 are an example of a through hole provided in the valve body 70 and penetrating in the axial direction.

The spoke valve 71B is an example of a second spoke valve arranged further on the second end 40b side (orifice collar 80 side) than the spoke valve 71A. The spoke valve 71C is located at the lower end portion on the second end 40b side. The spoke valve 71C is an example of a third spoke valve which is arranged so as to come into contact with the end face in the central axis C direction of the orifice collar 80 which is a tubular body. It can also be said that the spoke valve 71C is located closest to the orifice collar 80 side among the three spoke valves 71A, 71B, and 71C.

The outer frame portion 74 and the spoke portion 72S of the spoke valve 71B and the outer frame portion 74 and the spoke portion 72S of the spoke valve 71C have the same configurations as the outer frame portion 74 and the spoke portion 72S of the spoke valve 71A, as illustrated in the drawing.

However, the inner frame portion 75 of the spoke valve 71B is formed radially inward of the inner frame portion 75 of the spoke valve 71A. That is, the inner frame portion 75 of the spoke valve 71B is smaller in size than the inner frame portion 75 of the spoke valve 71A. As a result, the central hole 76 of the spoke valve 71B is smaller than the central hole 76 of the spoke valve 71A.

Further, the inner frame portion 75 of the spoke valve 71C is formed radially outside the inner frame portion 75 of the spoke valve 71A. That is, the inner frame portion 75 of the spoke valve 71C is larger in size than the inner frame portion 75 of the spoke valve 71A. As a result, the central hole 76 of the spoke valve 71C is larger than the central hole 76 of the spoke valve 71A.

That is, the size of the central hole 76 becomes smaller in the order of the spoke valve 71C, the spoke valve 71A, and the spoke valve 71B.

The spoke valve 71A and the spoke valve 71C are formed by stacking a plurality of plate-shaped members having the same shape. In the embodiment, the spoke valve 71A and the spoke valve 71C are respectively formed by stacking three plate-shaped members.

On the other hand, the spoke valve 71B is not a stacked body like this, but a single plate-shaped member.

As illustrated in FIGS. 4 and 6, the inner frame portion 75 of the spoke valve 71A has an upper surface, which is a surface on the first end 40a side, accommodated in the accommodation portion 61k of the drive valve 61. That is, the diameter of the central hole 76 of the spoke valve 71A is substantially equal to the outer diameter of the accommodation portion 61k of the drive valve 61, and the inner peripheral surface of the central hole 76 and the accommodation portion 61k are in contact with each other.

The upper surface of the inner frame portion 75 of the spoke valve 71B, which is the surface on the first end 40a side, faces the second step portion 61e of the drive valve 61.

Further, the inner frame portion 75 of the spoke valve 71C is placed on an orifice collar 80 and the valve collar 78, which will be described below.

The opening portion 77 of each of the spoke valve 71A, the spoke valve 71B, and the spoke valve 71C functions as a part of a flow passage through which oil flows. It can also be said that the opening portion 77 is a flow passage in the central axis C direction in the valve body 70.

The axial gap between the spoke valve 71A and the spoke valve 71B functions as a gap flow passage 110A which allows oil to flow therethrough. Similarly, the axial gap between the spoke valve 71B and the spoke valve 71C also functions as a gap flow passage 110B which allows oil to flow therethrough. The gap flow passage 110A and the gap flow passage 110B are a part of the flow passage formed in the valve body 70 and can be said to be radial flow passages in the valve body 70. Hereinafter, when the gap flow passage 110A and the gap flow passage 110B are not distinguished from each other, they may be simply referred to as "gap flow passage 110".

The spacer 73A has an annular shape and is arranged between the spoke valve 71A and the spoke valve 71B to adjust the gap between the spoke valve 71A and the spoke valve 71B. Thereby, the flow passage area of the gap flow passage 110A between the spoke valve 71A and the spoke valve 71B is adjusted. Further, since the protective valve 710A is provided between the spoke valve 71A and the spoke valve 71B, the spacer 73A is arranged so as to be interposed between the spoke valve 71A and the protective valve 710A.

The spacer 73B also has an annular shape and is arranged between the spoke valve 71B and the spoke valve 71C to adjust the gap between the spoke valve 71B and the spoke valve 71C. Thereby, the flow passage area of the gap flow passage 110B between the spoke valve 71B and the spoke valve 71C is adjusted. Further, since the protective valve 710B is provided between the spoke valve 71B and the spoke valve 71C, the spacer 73B is arranged so as to be interposed between the protective valve 710B and the spoke valve 71C.

The spacer 73A and the spacer 73B are arranged so as to be respectively located between the outer frame portions 74 of the spoke valves 71A, 71B, and 71C which are adjacent to each other in the stacking direction. That is, the spacer 73A and the spacer 73B have the same shape and size as the outer frame portions 74 of the spoke valves 71A, 71B, and 71C and are interposed between the outer frame portions 74 adjacent in the stacking direction, so the spacers 73A and spacers 73B adjust the distance between the spoke valve 71A and the spoke valve 71B and the distance between the spoke valve 71B and the spoke valve 71C.

Further, in the embodiment, the protective valve 710A is interposed between the spacer 73A and the spoke valve 71B. Further, the protective valve 710B is interposed between the spoke valve 71B and the spacer 73B. That is, the protective valves 710A and 710B are arranged in contact with the spoke valve 71B and are arranged so as to interpose the spoke valve 71B.

As will be described below in detail, the protective valve 710B protects the spoke portion 72S when the spoke portion 72S of the spoke valve 71C is deformed.

The protective valves 710A and 710B are claw valves which include the outer frame portion 74 formed in a ring shape and a claw portion 711 which protrudes inward from the outer frame portion 74 and is formed at a position corresponding to the spoke portion 72S of the spoke valve 71B.

The outer frame portions 74 of the protective valves 710A and 710B have the same shape and size as the outer frame portions 74 of the spoke valve 71B and the spacers 73A and 73B. Therefore, the outer frame portion 74 of the protective valve 710A is interposed between the outer frame portions 74 of the spacer 73A and the spoke valve 71B. Further, the outer frame portion 74 of the protective valve 710B is interposed between the outer frame portions 74 of the spoke valve 71B and the spacer 73B.

Further, as described above, three spoke portions 72S of the spoke valve 71B are arranged at equal intervals in the circumferential direction. Therefore, three claw portions 711 of the protective valve 710A or 710B formed at positions corresponding to the spoke portion 72S are also arranged at equal intervals in the circumferential direction. That is, one claw 711 is arranged every 120° in the circumferential direction of the protective valves 710A and 710B. Although described below in detail, the protective valve 710B protects a connecting portion 713 between the outer frame portion 74 and the spoke portion 72S of the spoke valve 71C by those claw portions 711.

Further, the protective valve 710A can be regarded as a gap adjusting member which adjusts the gap between the spoke valve 71A and the spoke valve 71B together with the spacer 73A. Similarly, the protective valve 710B, together with the spacer 73B, can be regarded as a gap adjusting member which adjusts the gap between the spoke valve 71B and the spoke valve 71C. That is, the protective valves 710A and 710B adjust the gap between the adjacent spoke valves in the stacking direction, as similar to the spacers 73A and 73B.

The valve collar 78 is an example of a positioning member for the spoke valves 71A, 71B, and 71C and the protective valves 710A and 710B of the valve body 70. The valve collar 78 includes a first recess portion 78a arranged at a position corresponding to the spoke portions 72S of the spoke valves 71A, 71B, and 71C and the claw portions 711 of the protective valves 710A and 710B in the circumferential direction. As described above, in the embodiment, since the three spoke portions 72S are arranged at equal intervals in the circumferential direction, the three first recess portions 78a are provided at equal intervals in the circumferential direction. Furthermore, the valve collar 78 is provided with a convex portion 78b which protrudes with respect to the first recess portion 78a between the adjacent first recess portions 78a in the circumferential direction. The three convex portions 78b provided at equal intervals in the circumferential direction penetrate the opening portions 77 of the spoke valves 71A, 71B, and 71C. As a result, the spoke valves 71A, 71B, and 71C and the protective valves 710A and 710B can be positioned in the circumferential direction.

The valve collar 78 has a mounting portion 78d. The inner frame portion 75 of the spoke valve 71C is mounted on the mounting portion 78d. As a result, the spoke valves 71A, 71B, and 71C can be positioned in the direction of the central axis C.

Further, the convex portion 78b of the valve collar 78 has a second recess portion 78c which is recessed and formed above the first recess portion 78a. Then, as illustrated by the dotted line L1 in FIG. 4, the upper surface of the first recess portion 78a and the upper surface of the second recess portion 78c are on the same slope.

In the embodiment, six convex portions 78b of the valve collar 78 are provided. Therefore, there are six recess portions between the respective convex portions 78b, including the above-described first recess portion 78a and second recess portion 78c. It can be said that there are recess portions at equal intervals every 60° in the circumferential direction. Therefore, when the recess portions with a uniform depth are created, when assembling the valve body 70, in some cases, the spoke portions 72S of the spoke valves 71A, 71B, and 71C and the claw portions 711 of the protective valve 710B may enter a recess portions which are 60° circumferentially displaced from the recess portions where the spoke portions or the claw portions should enter. In order to prevent this, the recess portion such as the first recess portion 78a where the spoke portion or the claw portion should originally enter is formed deep and the recess portion such as the second recess portion 78c where the spoke portion or the claw portion should not enter is formed shallow. The deeply formed recess portions and the shallowly formed recess portions are alternately arranged in the circumferential direction as illustrated in the drawing and the deeply formed recess portions are arranged every 120° in the circumferential direction. Therefore, at the time of assembly, it becomes easy to accommodate the spoke portion 72S and the claw portion 711 in the recess portion where the spoke portion or the claw portion should originally enter. Moreover, by making the upper surface of the first recess portion 78a an inclined surface, the spoke valve 71C and the upper surface of the first recess portion 78a do not come into contact with each other. The inner frame portion 75 of the spoke valve 71C is mounted on the mounting portion 78d. That is, by setting the upper surface of the first recess portion 78a to be an inclined surface separately from the mounting portion 78d, the inner frame portion 75 of the spoke valve 71C is mounted on the mounting portion 78d, and thus the sealing property between the spoke valve 71C and the valve collar 78 can be secured. Furthermore, by setting the upper surface of the first recess portion 78a and the upper surface of the second recess portion 78c on the same slope, the first recess portion 78a and the second recess portion 78c can be machined together by using a circular cutter or milling cutter, which makes the manufacture of the valve collar 78 easier.

The coil spring 79 is provided in a compressed state in the recess portion 78e provided on the second end 40b side of the valve collar 78. When the drive valve 61 presses the valve body 70, the coil spring 79 is pressed via the valve body 70 and the valve collar 78, so that the coil spring 79 is maintained in a compressed state.

The orifice collar 80 is an example of a tubular body and is arranged so as to face the drive valve 61 with the valve body 70 interposed therebetween.

The orifice collar 80 has an upper step portion 81 for coming in contact with and accommodating the valve body 70 on the end surface on the first end 40a side in the central axis C direction. The valve body 70 is accommodated in the orifice collar 80 in a state where the end surface of the upper step portion 81 on the side of the first end 40a in the central axis direction is in contact with the end surface of the inner frame portion 75 of the spoke valve 71C on the side of the orifice collar 80.

Further, the orifice collar 80 has a through hole 82 as a hollow portion penetrating in the axial direction. The through hole 82 allows oil to flow in the central axis C direction (axial direction) inside the orifice collar 80. The through hole 82 is composed of an upper through hole 82H located on the upper side which is the first end 40a side, a lower through hole 82L located on the lower side which is the second end 40b side, and a middle through hole 82M connecting the upper through hole 82H and the lower through hole 82L. Of these, the flow passages of the upper through hole 82H and the lower through hole 82L have a constant diameter in the central axis C direction (axial direction). On the other hand, the central through hole 82M has an orifice shape whose diameter decreases along the central axis C direction (axial direction) as the distance from the valve body 70 increases. In other words, it can be said that the middle through hole 82M is an orifice portion whose inner diameter increases as it approaches the valve body 70. The diameter of the first end 40a side end of the middle through hole 82M is set to be the same as the diameter of the upper through hole 82H and the diameter of the second end 40b side end of the middle through hole 82M is set to be the same as the diameter of the lower through hole 82L, in such a manner that the upper through hole 82H, the middle through hole 82M, and the lower through hole 82L are continuously connected.

As illustrated in FIG. 4, the tip of the protruding portion 61c on the side of the second end 40b is arranged so as to enter the inside of the through hole 82 of the orifice collar 80. When the middle through hole 82M of the through hole 82 is not formed into an orifice shape, the distance between the protruding portion 61c and the inner peripheral surface of the through hole 82 becomes small, and thus oil circulation is likely to be hindered. On the other hand, in the embodiment, since the middle portion through hole 82M that is the orifice portion is provided, the oil can flow more smoothly.

Further, as will be described below in detail, when the diameter of the opening of the upper through hole 82H is changed, the pressure receiving area in the compression side stroke changes. Therefore, since the orifice collar 80 is not integrated with the valve seat member 50 and is formed as a separate member, it becomes easier to use the orifice collar 80 in which the diameter of the opening of the upper through hole 82H is changed, so the attenuation characteristic can be easily changed. The orifice collar 80 can be easily replaced by, for example, screwing it onto the valve seat member 50.

[Description of Operation of Damping Force Generating Device 40]

Next, the operation of the damping force generating device 40 will be described according to the embodiment.

(Compression Side Stroke)

In the compression side stroke in which the piston 12 moves to the vehicle body side in the cylinder 11, the oil in the piston-side oil chamber 51 is compressed by the piston 12. Then, the oil in the piston-side oil chamber 51 is sent from the oil hole 102 formed in the damper case 16 to the first oil chamber S11 formed in the damper holding portion 27. As indicated by the arrow C1 in FIG. 3, the oil sent into the first oil chamber S11 passes through the compression side inlet oil passage 48c formed in the compression side valve seat member 48 of the main damper 42, and then the oil pushes open the compression side damping valve 47 provided on the outlet side and flows into the second oil chamber S12. In this case, the compression side damping valve 47 is pushed open to allow the oil to pass through the gap formed between the outlet of the compression side inlet oil passage 48c and the compression side damping valve 47, whereby a damping force is generated.

Part of the oil which has flowed into the second oil chamber S12 passes through the communication passage 107 formed in the damper case 16 and flows into the oil reservoir chamber S3 as indicated by the arrow C2 in FIG. 3. In addition, as indicated by the arrow C3 in FIG. 3, the remaining oil flowing into the second oil chamber S12 flows into the compression side outlet oil passage 44c of the extension side valve seat member 44, pushes the compression side outlet check valve 43 open, and flows into the third oil chamber S13.

The oil flowing into the third oil chamber S13 passes through the flow passage 105 formed in the damper case 16, and then the oil flows from the oil hole 104 formed at the upper end portion of the outer cylinder 15 into the cylindrical flow passage 101 formed between the inner cylinder 14 and the outer cylinder 15. The oil which flows into the flow passage 101 passes through the oil hole 103 and flows into the rod-side oil chamber S2. In this way, the oil flows into the rod-side oil chamber S2, by the oil flowing into the rod-side oil chamber S2, when the piston rod 13 enters the cylinder 11, the amount of oil corresponding to the entry volume of the piston rod 13 is compensated.

On the other hand, as indicated by the arrow C4 in FIG. 3, the oil in the first oil chamber S11 flows into the inside of the large diameter portion 52 of the valve seat member 50 from the flow passage hole 56 formed in the large diameter portion 52 of the valve seat member 50.

As indicated by the arrow C5 in FIG. 4, the oil flowing into the large diameter portion 52 passes through the opening portions 77 formed in the spoke valve 71B and the spoke valve 71C, the gap flow passage 110, and the central holes 76 formed in the spoke valve 71B and the spoke valve 71C, and then the oil flows into the through hole 82 of the orifice collar 80. After that, the oil which flows into the through hole 82 passes through the central flow passage 106 formed in the valve seat member 50 and flows into the third oil chamber S13.

In this case, a damping force is generated by the resistance generated when the oil flowing through the path indicated by the arrow C5 passes through the gap flow passage 110.

(Extension Side Stroke)

In the extension side stroke in which the piston 12 moves to the wheel side in the cylinder 11 due to the vertical movement of the wheel, the oil in the rod-side oil chamber S2 is compressed by the piston 12. Then, the oil in the rod-side oil chamber S2 passes through the oil hole 103 formed at the lower end portion of the inner cylinder 14 and flows into the cylindrical flow passage 101 formed between the inner cylinder 14 and the outer cylinder 15. The oil flowing through the flow passage 101 is sent from the oil hole 104 formed at the upper end portion of the outer cylinder 15 through the flow passage 105 formed in the damper case 16 to the third oil chamber S13 of the damping force generating device 40.

As indicated by the arrow T1 in FIG. 3, the oil sent to the third oil chamber S13 flows into the extension side inlet oil passage 44t of the extension side valve seat member 44 and the extension side damping valve 45 provided on the outlet side is pushed open to generate a damping force.

The oil that has passed through the gap formed between the extension side inlet oil passage 44t and the extension side damping valve 45 flows into the second oil chamber S12. Further, as indicated by the arrow T2 in FIG. 3, in order to compensate for the volume change of the piston rod 13 in the cylinder 11 due to the movement of the piston 12, the oil passes through the communication passage 107 formed in the damper case 16 and flows from the oil reservoir chamber S3 to the second oil chamber S12.

As indicated by the arrow T3 in FIG. 3, the oil flowing into the second oil chamber S12 passes through the extension side outlet oil passage 48t of the compression side valve seat member 48, pushes the extension side outlet check valve 49 open, and flows into the first oil chamber S11.

The oil flowing into the first oil chamber S11 flows into the piston-side oil chamber 51 from the oil hole 102 formed in the damper case 16. In this way, the oil flows into the piston-side oil chamber 51 to compensate the oil amount corresponding to the withdrawal volume of the piston rod 13 when the piston rod 13 withdraws from the cylinder 11.

On the other hand, as indicated by the arrow T4 in FIG. 3, the oil flowing into the third oil chamber S13 flows into the central flow passage 106 from the tip of the small diameter portion 51 of the valve seat member 50 and heads for the through hole 82 of the orifice collar 80 in the control valve portion 60.

The oil flowing into the through hole 82 in this way passes through the central holes 76 formed in the spoke valve 71A and the spoke valve 71B from the through hole 82 of the orifice collar 80, as indicated by the arrow T5 in FIG. 4. The oil passing through the central hole 76 passes through the gap flow passage 110 and the opening portions 77 formed in the spoke valve 71B and the spoke valve 71C, and then the oil flows into the first oil chamber 511 through the flow passage hole 56 formed in the large diameter portion 52 of the valve seat member 50.

In this case, a damping force is generated by the resistance generated when the oil flowing through the path indicated by the arrow T5 passes through the gap flow passage 110.

Figure 7A:
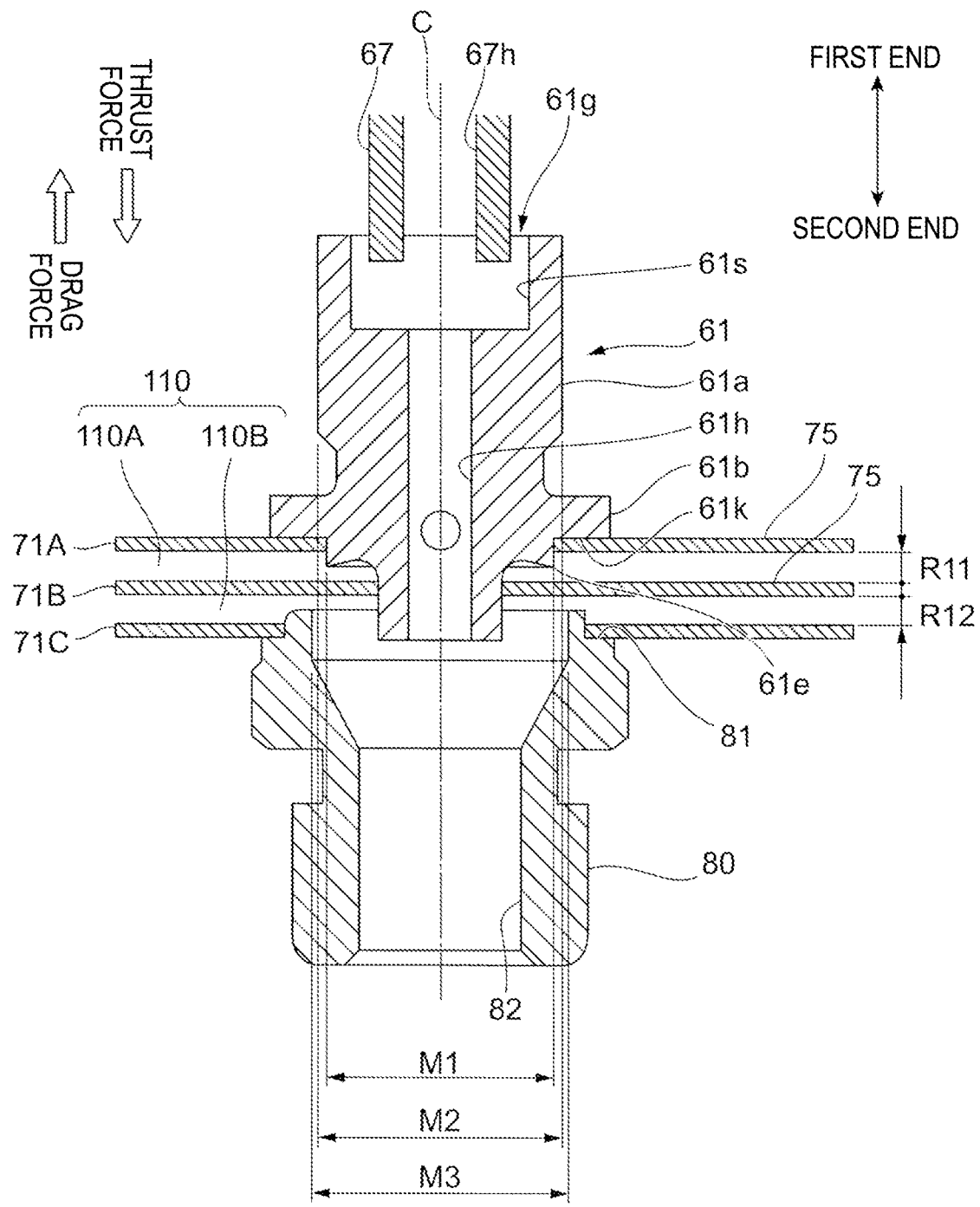
FIG. 7A is a diagram illustrating a state before the drive valve is displaced to a valve body side.
Figure 7B:
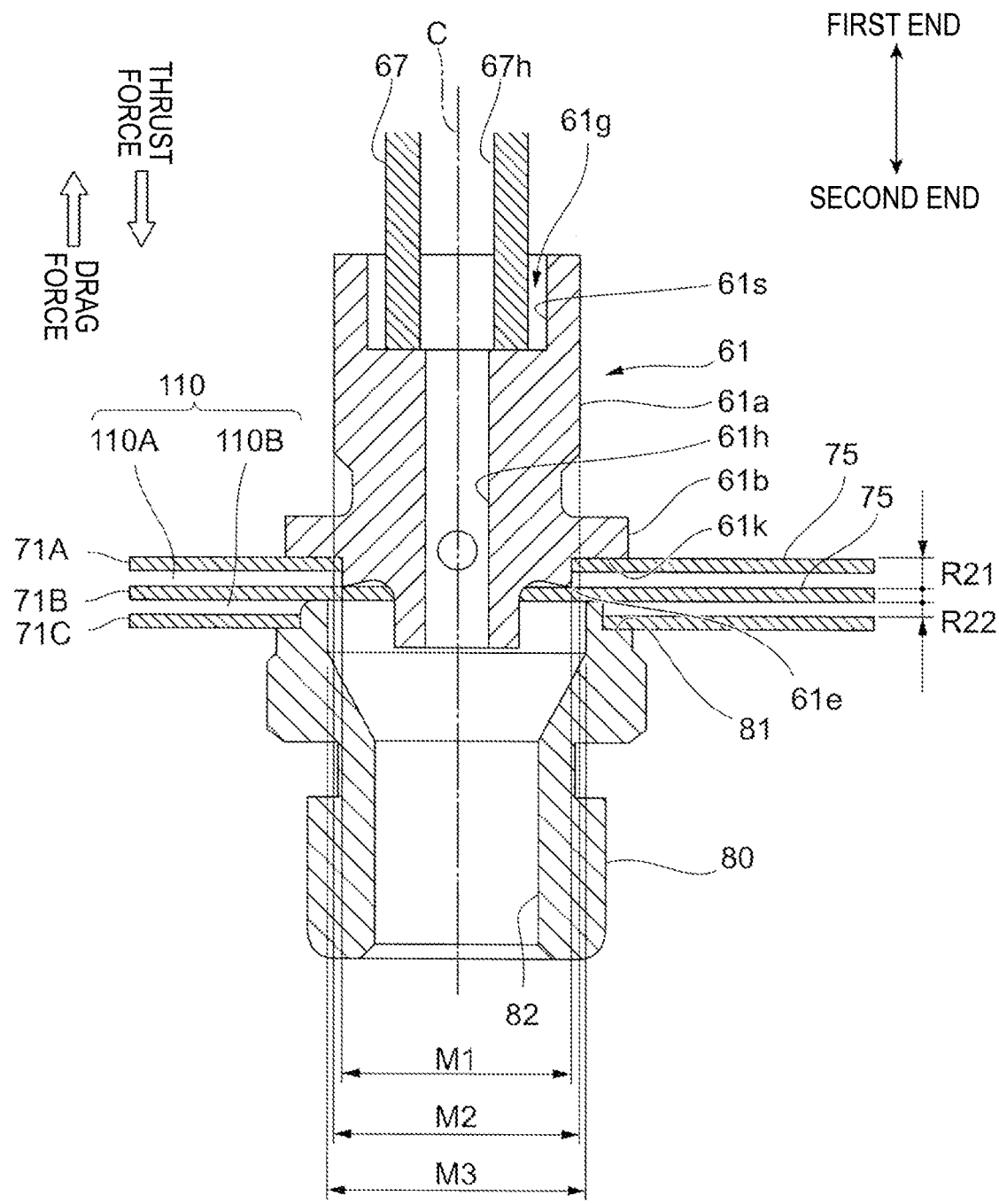
FIG. 7B is a diagram illustrating a state after the drive valve is displaced to the valve body side.

FIGS. 7A and 7B are cross-sectional views comparing before and after displacing the drive valve 61 to the valve body 70 side by the thrust force of the solenoid actuator 62. Among those, FIG. 7A illustrates a state before displacing the drive valve 61 to the valve body 70 side and FIG. 7B illustrates a state after displacing the drive valve 61 to the valve body 70 side.

In the state illustrated in FIG. 7A, the thrust force of the solenoid actuator 62 is not generated. Therefore, the drive valve 61 does not press the valve body 70. Since it is not pushed by the drive valve 61, none of the spoke valve 71A, the spoke valve 71B, and the spoke valve 71C of the valve body 70 is deformed. When the thrust force of the solenoid actuator 62 is not generated, a width R11 of the gap flow passage 110A between the spoke valve 71A and the spoke valve 71B and a width R12 of the gap flow passage 110B between the spoke valve 71B and the spoke valve 71C are substantially uniform in the radial direction of each spoke valve. The width R11 and the width R12 are respectively the thicknesses of the spacer 73A and the spacer 73B.

On the other hand, in the state illustrated in FIG. 7B, thrust force of the solenoid actuator 62 is generated. Under the condition where the thrust force of the solenoid actuator 62 is generated, the rod 67 moves in a direction of pressing the valve body 70 and the moved rod 67 and the drive valve 61 come into contact with each other. In this way, after the rod 67 and the drive valve 61 come into contact with each other, when the rod 67 which receives the thrust force further moves in the direction of pressing the valve body 70, the drive valve 61 also moves in the direction of pressing the valve body 70 and the drive valve 61 presses the valve body 70. In this case, the accommodation portion 61k of the drive valve 61 presses the inner frame portion 75 of the spoke valve 71A, and subsequently, the second step portion 61e of the drive valve 61 presses the inner frame portion 75 of the spoke valve 71B. As a result, the respective spoke portions 72S of the spoke valve 71A and the spoke valve 71B are mainly elastically deformed and the inner frame portions 75 of the spoke valve 71A and the spoke valve 71B move to the second end 40b side. That is, in this case, it moves downward in the drawing.

Even when the thrust force of the solenoid actuator 62 is generated, the outer frame portions 74 of the spoke valve 71A and the spoke valve 71B are hardly deformed. Further, since there is the spacer 73A between the outer frame portion 74 of the spoke valve 71A and the outer frame portion 74 of the spoke valve 71B, the distance between the spoke valve 71A and the spoke valve 71B does not change at this point. On the other hand, the inner frame portion 75 of the spoke valve 71A moves toward the second end 40b side by being pressed and elastically deformed. Further, the inner frame portion 75 of the spoke valve 71B moves toward the second end 40b side by being pressed and elastically deformed after the second step portion 61e comes into contact with the spoke valve 71B. That is, the inner frame portion 75 of the spoke valve 71B moves later than the inner frame portion 75 of the spoke valve 71A. As a result, the gap of the gap flow passage 110A between the spoke valve 71A and the spoke valve 71B becomes smaller than R11 and becomes R21 illustrated in FIG. 7B. That is, the inner frame portions 75 of the spoke valve 71A and the spoke valve 71B are pressed and elastically deformed, so that the flow passage area of the gap flow passage 110A is reduced. That is, it is configured such that, by elastically deforming the inner peripheral portion of the valve body 70, which comes into contact with the drive valve 61 that has moved in a direction toward the valve body 70, relative to the outer peripheral portion of the valve body 70, in the direction toward the orifice collar 80, the gap between the plurality of valve bodies 70 can be changed.

Further, the inner frame portion 75 of the spoke valve 71C does not move because it is not pressed, but the inner frame portion 75 of the spoke valve 71B moves by being pressed and elastically deformed. Therefore, the gap of the gap flow passage 110B between the inner frame portion 75 of the spoke valve 71B and the inner frame portion 75 of the spoke valve 71C becomes smaller than R12 and becomes R22 illustrated in FIG. 7B. That is, the inner frame portions 75 of the spoke valve 71A and the spoke valve 71B are pressed and elastically deformed, so that the flow passage area of the gap flow passage 110B is reduced.

The damping force generated when the oil passes through the gap flow passage 110 is the force in a direction to move the drive valve 61 to the valve opening side. That is, when the oil passes through the gap flow passage 110, a drag force against the force that displaces the drive valve 61 to the valve body 70 side by the solenoid actuator 62 is generated.

This drag force is a force that tends to separate the second step portion 61e from the spoke valve 71B in the compression side stroke and the pressure receiving area, which is the area to which this drag force is exerted, is the area of the circle at the second step portion 61e. That is, it is the area of a circle of a diameter M1 illustrated in FIG. 7A. In addition, the above-described drag force is a force in a direction to separate the spoke valve 71B from the orifice collar 80 in the extension side stroke and the pressure receiving area, which is the area to which this drag force is exerted, is the area of the circle of the opening of the upper through hole 82H of the orifice collar 80. That is, it is the area of a circle of a diameter M3 illustrated in FIG. 7A.

On the other hand, as described above, the drive valve 61 is formed with a through hole 67h communicating in the central axis C direction. Further, a communication hole which communicates the inside of the through hole 67h with the gap 61g of the drive valve 61 is formed at the tip of the rod 67 and the back pressure chamber 65r is further formed at the tip thereof. Therefore, the oil can wrap around behind the drive valve 61, which produces a force (back pressure) in a direction to cancel the above-described drag force. Here, the second end 40b side of the drive valve 61 and the back pressure chamber 65r communicate with each other through the flow passage 61h. Therefore, it is considered that the pressure on the second end 40b side of the drive valve 61, which is the side exerting the drag force, and the back pressure on the back pressure chamber 65r side are almost the same. The pressure receiving area, which is the area exerting the back pressure, is the area of the circle at an outer peripheral surface 61a. This is the area of the circle of a diameter M2 illustrated in FIG. 7A.

Therefore, in the compression side stroke, the annular area, which is the difference between the area of the circle having the diameter M1 and the area of the circle having the diameter M2, is the substantial pressure receiving area of the drag force, and in the extension side stroke, the annular area, which is the difference between the area of the circle having the diameter M2 and the area of the circle having the diameter M3, is the substantial pressure receiving area of the drag force. Further, in the embodiment, the contact area between the second step portion 61e and the valve body 70 is reduced by providing the apex portion 61e2 in the second step portion 61e. As described above, by reducing the contact area between the second step portion 61e and the valve body 70, the pressure receiving diameter when the valve is opened can be controlled with higher accuracy. As a result, the damping force can be controlled with higher accuracy.

When the drag force becomes larger than the force which displaces the drive valve 61 to the valve body 70 side by the solenoid actuator 62, the drive valve 61 moves to the valve opening side. As a result, in the compression side stroke, the second step portion 61e and the spoke valve 71B are separated from each other to form a first gap, and in the extension side stroke, the spoke valve 71B and the orifice collar 80 are separated from each other to form a second gap. By forming the first gap and the second gap in this manner, the flow passage area can be increased in each of the compression side stroke and the extension side stroke. On the other hand, by increasing the flow passage area and then reducing the drag force, in the compression side stroke, the second step portion 61e and the spoke valve 71B can be brought into contact with each other, and in the extension side stroke, the spoke valve 71B and the orifice collar 80 can be brought into contact with each other. In this way, in the invention, the increased flow passage area can be reduced. That is, according to the invention, the flow passage area can be increased or decreased by the damping pressure.

In the embodiment, the oil which flows due to the sliding of the piston 11 flows into the control valve portion 60 to generate a damping force. The higher drag force is when the oil flows through the gap flow passage 110 at high speed, for example, this is a case where the wheels are abruptly displaced in the vertical direction due to the unevenness of the road surface, or the like and the piston 12 is displaced at a high speed in the cylinder 11. In such a case, since the drag force becomes large, the first gap and the second gap tend to become large. By increasing the first gap and the second gap, a larger amount of oil can be circulated in the first gap and the second gap.

The damping force can be adjusted by the thrust force of the solenoid actuator 62 pressing the drive valve 61. That is, the smaller the thrust force with which the solenoid actuator 62 presses the drive valve 61, the greater the drag force becomes than the thrust force. Therefore, the first gap and the second gap tend to become large and the damping force becomes small. On the other hand, as the thrust force with which the solenoid actuator 62 presses the drive valve 61 is larger, the drag force is less likely to be larger than the thrust force, so that the first gap and the second gap are likely to be small, and thus the damping force is large.

In the control valve portion 60, the valve body 70 is highly accurately positioned by the valve collar 78. Further, the positions between the spoke valves 71A, 71B and 71C and the spacers 73A and 73B which form the valve body 70 are also positioned with high accuracy. Therefore, the flow passage area of the gap flow passage 110 can be determined with high accuracy, and thus the damping force generated in the gap flow passage 110 can be adjusted with higher precision.

Also, since the oil flow passages are different between the compression side stroke and the extension side stroke, it is possible to adjust the damping force independently in each of the compression side stroke and the extension side stroke by changing the thickness of the spacer 73A and the spacer 73B, for example.

Further, the spoke valves 71A, 71B, 71C, the spacers 73A, 73B, and the protective valves 710A, 710B are plate-shaped members and can be easily formed by punching the plate material by pressing or the like. Further, the plate thickness accuracy can be easily increased by using the plate-shaped member. Further, those plate-shaped members have no directivity with respect to the front and back sides. As a result, when assembling, it is possible to stack without worrying about the front and back sides, and thus the assembling property of the valve body 70 is improved.

Further, in the embodiment, the protective valve 710B protects the spoke portion 72S of the spoke valve 71C in the compression side stroke.

Figure 8A:
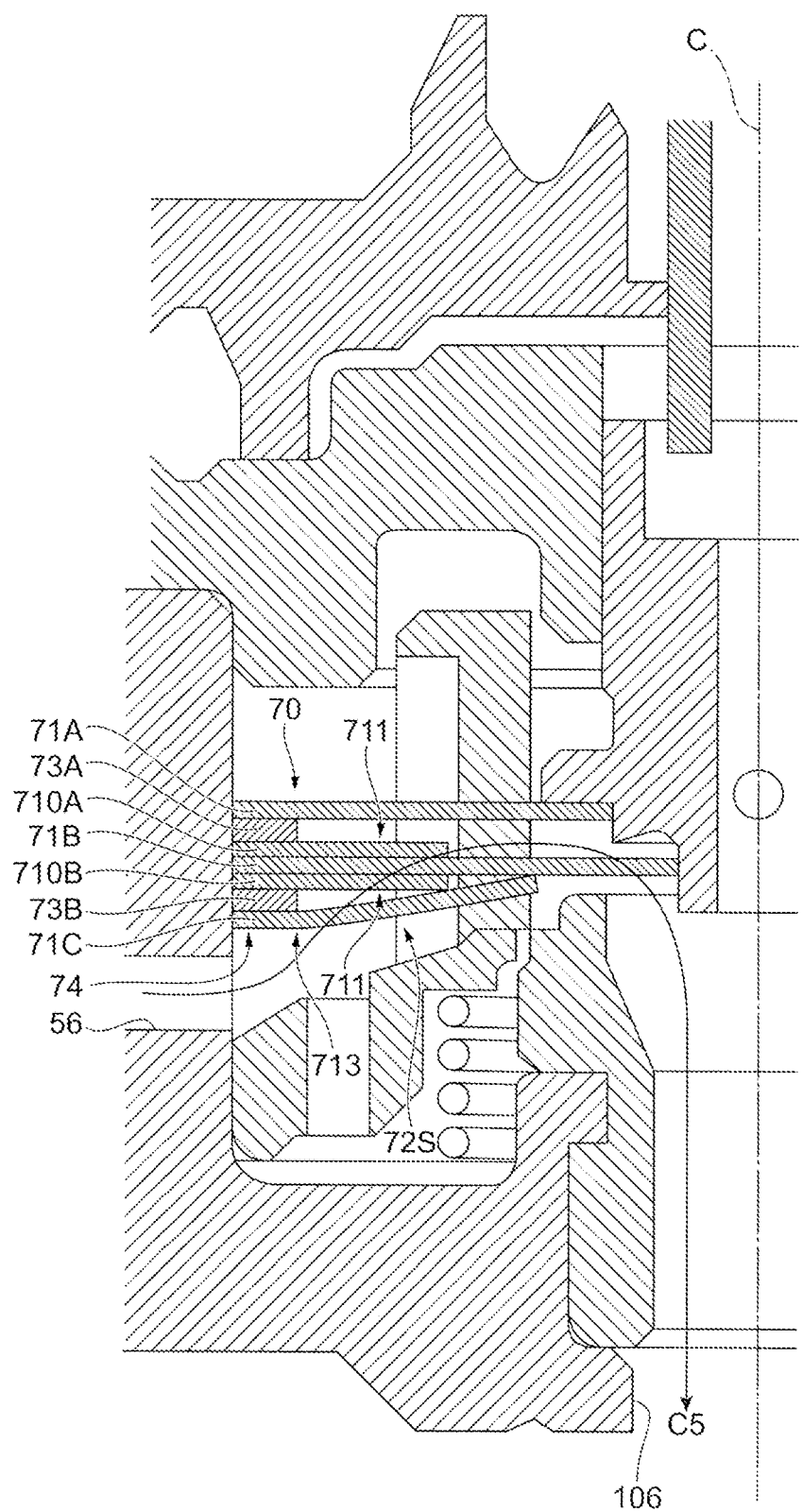
FIG. 8A is a diagram illustrating a state of a spoke valve when a protective valve is provided in a compression side stroke.
Figure 8B:
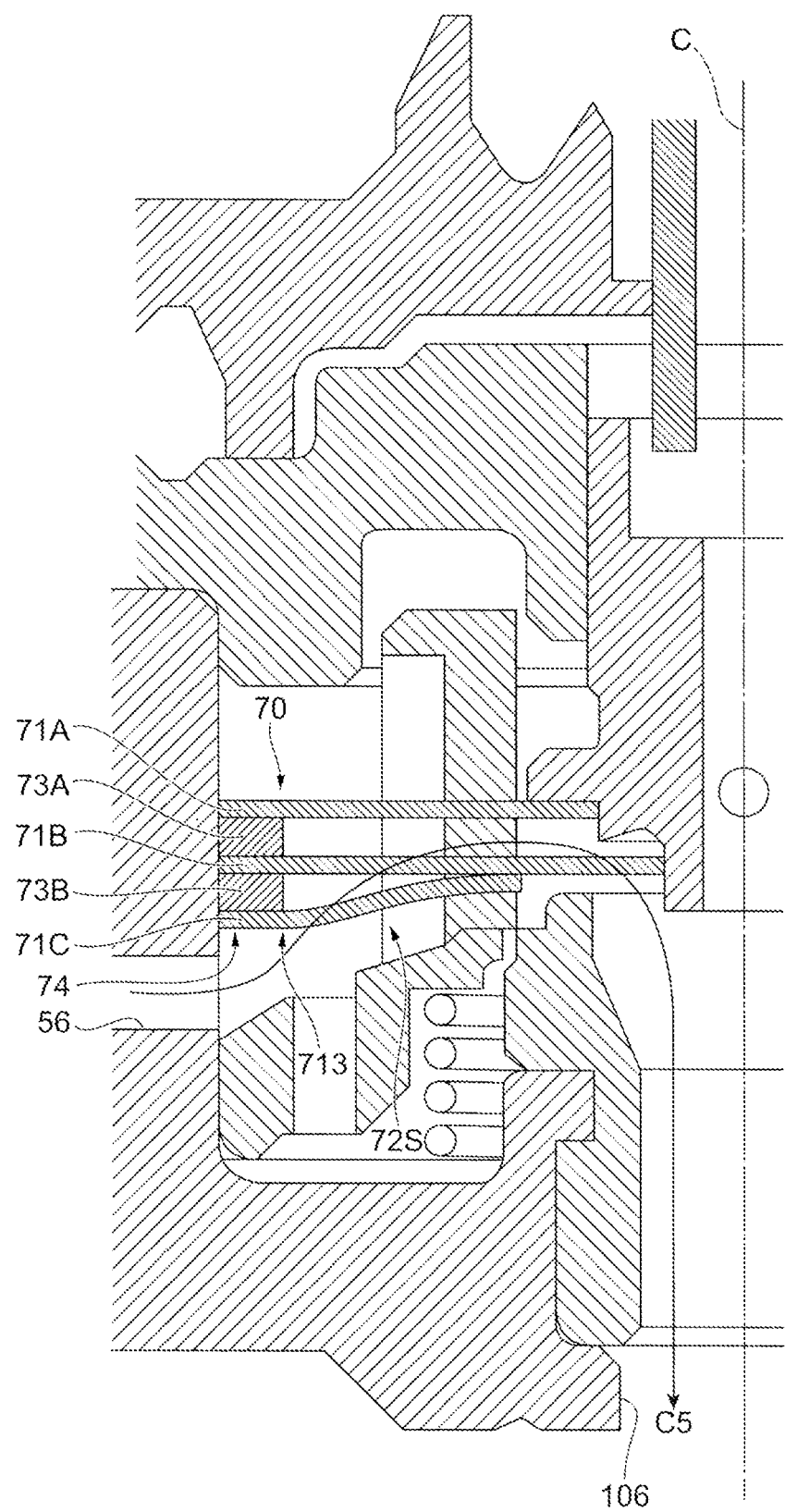
FIG. 8B is a diagram illustrating a state of the spoke valve when the protective valve is not provided in the compression side stroke.

FIG. 8A is a view illustrating a state of the spoke valve 71C when the protective valves 710A and 710B are provided in the compression side stroke. FIG. 8B is a diagram illustrating a state of the spoke valve 71C when the protective valves 710A and 710B are not provided in the compression side stroke.

In the compression side stroke, as illustrated by the arrow C5 in FIG. 4, the oil flows from the flow passage hole 56 into the valve body 70 and the oil first comes into contact with the spoke valve 71C. Then, when the piston 12 is displaced at a high speed in the cylinder 11 and the oil flows at a high speed, the spoke valve 71C may be excessively bent by the pressure of the oil as illustrated in FIG. 8B. This deflection becomes larger in the connecting portion 713 between the outer frame portion 74 of the spoke valve 71C and the spoke portion 72S. Therefore, in order to improve the durability of the valve body 70, it is necessary to protect the connecting portion 713.

Therefore, in this embodiment, as illustrated in FIG. 8A, the protective valve 710B is provided to protect the connecting portion 713 of the spoke valve 71C. The protective valve 710B includes the claw portion 711 as described above. Then, as illustrated in FIG. 8A, when the spoke valve 71C is bent by the pressure of the oil, the spoke portion 72S comes into contact with the claw portion 711 of the protective valve 710B. As a result, excessive bending of the spoke valve 71C is suppressed and bending of the connecting portion 713 is also suppressed. As a result, the spoke valve 71C can be protected.

In the embodiment, in the extension side stroke, as indicated by the arrow T5 in FIG. 4, the oil flows from the through hole 82 of the orifice collar 80 into the valve body 70 and comes into contact with the spoke valve 71A. However, in the extension side stroke, as compared with the compression side stroke, the piston 12 is less likely to be displaced in the cylinder 11 at a high speed, and the oil is further less likely to flow at a high speed. Therefore, there is little need to protect the spoke valve 71A with the protective valve 710A. Therefore, the protective valve 710A does not necessarily have to be provided. That is, the protective valve needs to be arranged on the spoke valve 71C side with respect to the spoke valve 71B, but not necessarily on the spoke valve 71A side. Of course, the invention is not limited to this embodiment and it is possible to arrange the protective valve 710A also on the spoke valve 71A side and protect the spoke valve 71A with the protective valve 710A.

However, when the protective valve 710A is not provided, the axial symmetry of each member forming the valve body 70 is lost. That is, when the protective valve 710A is provided, it becomes symmetrical in the axial direction about the spoke valve 71B, whereas when the protective valve 710A is not provided, this symmetry cannot be maintained. Without this symmetry, in the assembly process of the valve body 70, it is necessary to confirm that the protective valve 710A is not provided on the spoke valve 71A side in the axial direction around the spoke valve 71B, but the protective valve 710B is provided on the spoke valve 71C side, which lowers the assembling property. Therefore, it is more preferable to provide the protective valve 710A in order to improve the assembling property.

Further, in the above-described example, as illustrated in FIGS. 4, 7A, and 7B, when the solenoid actuator 62 did not generate thrust force and the drive valve 61 is not pressed, the first step portion 61b is in contact with the spoke valve 71A. However, this is an example and the first step portion 61b and the spoke valve 71A do not have to be in contact with each other when the drive valve 61 is not pressed. That is, the first step portion 61b and the spoke valve 71A may be separated from each other, and there may be a gap between the first step portion 61b and the spoke valve 71A. When there is a gap between the first step portion 61b and the spoke valve 71A, if the solenoid actuator 62 generates thrust force, the drive valve 61 moves to the second end 40b side (orifice collar 80 side) to bring the separated first step portion 61b into contact with the spoke valve 71A. From this state, when the drive valve 61 moves toward the orifice collar 80 side, the spoke valve 71A is pressed by the first step portion 61b and the spoke valve 71A elastically deforms. Further, when the drive valve 61 moves to the orifice collar 80 side, the second step portion 61e comes into contact with the spoke valve 71B. Then, the second step portion 61e presses the spoke valve 71B and the spoke valve 71B elastically deforms toward the second end 40b side (orifice collar 80 side).

The configuration of the invention is not limited to the embodiment as long as the operation and effects of the invention are exhibited. For example, a configuration in which the oil flow in the compression side stroke and the oil flow in the extension side stroke are opposite to each other, that is, the oil flow in the extension side stroke is the arrow C5 in FIG. 4 and the oil flow in the compression side stroke is the arrow T5 in FIG. 4 can be applied.

REFERENCE SIGNS LIST

10: shock absorber
11: cylinder
12: piston
13: piston rod
40: damping force generating device
60: control valve portion (example of valve mechanism)
61: drive valve
61b: first step portion
61c: protruding portion
61d: communication hole
61e: second step portion
61h: flow passage
61k: accommodation portion
62: solenoid actuator
70: valve body 71A, 71B, 71C: spoke valve
72S: spoke portion
73A, 73B: spacer
74: outer frame portion
75: inner frame portion
78a: first recess portion
78b: convex portion
78c: second recess portion
80: orifice collar (example of tubular body)
81: upper step portion
82: through hole
710A, 710B: protective valve
711: claw portion

What is claimed is:

1. A valve mechanism, comprising:
a tubular body having a hollow portion penetrating in an axial direction;
a valve body having a through hole penetrating in the axial direction and arranged so as to come into contact with an axial end surface of the tubular body; and
a drive valve which is movable in the axial direction and is arranged on an opposite side of the tubular body with the valve body as a boundary, wherein
the valve body includes,
a spoke valve which includes an outer frame portion formed in an annular shape, an inner frame portion formed in an annular shape on an inner side in a radial direction with respect to the outer frame portion, and a plurality of spoke portions connecting the outer frame portion and the inner frame portion, and
a protective valve which protects the spoke portion when the spoke portion of the spoke valve is deformed, wherein
the protective valve is a claw valve having an annular outer frame portion and a claw portion protruding inward from the outer frame portion and formed at a position corresponding to the spoke portion of the spoke valve.

2. The valve mechanism according to claim 1, wherein
the valve body is formed by stacking a plurality of the spoke valves, and
the protective valve protects the spoke valve with which fluid first comes into contact during either a compression side stroke or an extension side stroke.

3. A shock absorber, comprising:
the valve mechanism according to claim 2;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

4. The valve mechanism according to claim 2, wherein
the spoke valve is a stack of three or more, and
when three or more of the spoke valves are set to a first spoke valve located closest to the drive valve side, a second spoke valve located closer to the tubular body side than the first spoke valve, and a third spoke valve located closest to the tubular body side, the protective valve is disposed in contact with the second spoke valve.

5. A shock absorber, comprising:
the valve mechanism according to claim 4;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

6. The valve mechanism according to claim 4, wherein
the third spoke valve comes into contact with the fluid first in either the compression side stroke or the extension side stroke, and
the protective valve is disposed at least on the third spoke valve side with respect to the second spoke valve.

7. A shock absorber, comprising:
the valve mechanism according to claim 6;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

8. The valve mechanism according to claim 6, wherein
the third spoke valve is protected by the spoke portion coming into contact with the protective valve when bent.

9. A shock absorber, comprising:
the valve mechanism according to claim 8;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

10. The valve mechanism according to claim 1, wherein
the protective valve protects a connecting portion between the outer frame portion of the spoke valve and the spoke portions.

11. A shock absorber, comprising:
the valve mechanism according to claim 10;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

12. A shock absorber, comprising:
the valve mechanism according to claim 1;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

13. A valve mechanism, comprising:
a valve body having a through hole penetrating in the axial direction and arranged so as to come into contact with an axial end surface of the tubular body; and
a drive valve which is movable in the axial direction and is arranged on an opposite side of the tubular body with the valve body as a boundary, wherein
the valve body includes,
　a spoke valve which includes an outer frame portion formed in an annular shape, an inner frame portion formed in an annular shape on an inner side in a radial direction with respect to the outer frame portion, and a plurality of spoke portions connecting the outer frame portion and the inner frame portion, and
　a protective valve which protects the spoke portion when the spoke portion of the spoke valve is deformed, wherein
the spoke valve is a stack of three or more, and
when three or more of the spoke valves are set to a first spoke valve located closest to the drive valve side, a second spoke valve located closer to the tubular body side than the first spoke valve, and a third spoke valve located closest to the tubular body side, the protective valve is disposed in contact with the second spoke valve, and wherein
a spacer is interposed between the protective valve and the third spoke valve.

14. A shock absorber, comprising:
the valve mechanism according to claim 13;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

15. A valve mechanism, comprising:
a tubular body having a hollow portion penetrating in an axial direction;
a valve body having a through hole penetrating in the axial direction and arranged so as to come into contact with an axial end surface of the tubular body; and
a drive valve which is movable in the axial direction and is arranged on an opposite side of the tubular body with the valve body as a boundary, wherein
the valve body includes,
a spoke valve which includes an outer frame portion formed in an annular shape, an inner frame portion formed in an annular shape on an inner side in a radial direction with respect to the outer frame portion, and a plurality of spoke portions connecting the outer frame portion and the inner frame portion,
a protective valve which protects the spoke portion when the spoke portion of the spoke valve is deformed, and
a positioning member for positioning the spoke valve and the protective valve, wherein
the positioning member performs circumferential positioning by forming a first recess portion for accommodating the spoke portion in a circumferential direction and forming a convex portion protruding with respect to the first recess portion at another location.

16. The valve mechanism according to claim 15, wherein
the positioning member has a second recess portion recessed from the convex portion and formed to be shallower than the first recess portion, and
an upper surface of the first recess portion and an upper surface of the second recess portion are on the same slope.

17. A shock absorber, comprising:
the valve mechanism according to claim 16;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

18. A shock absorber, comprising:
the valve mechanism according to claim 15;
a cylinder which accommodates a fluid;
a piston which is slidably fitted in the cylinder;
a piston rod which is connected to the piston and extended to an outside of the cylinder; and
an oil reservoir chamber which compensates an amount of oil corresponding to an entry volume of the piston rod when the piston rod enters the cylinder, wherein
the fluid which flows due to sliding of the piston flows into the valve mechanism to generate a damping force and the fluid which passes through the valve mechanism can flow through the oil reservoir chamber.

\* \* \* \* \*